(12) United States Patent
Kreizinger

(10) Patent No.: US 9,919,499 B2
(45) Date of Patent: Mar. 20, 2018

(54) STIFFENED FRAME SUPPORTED PANEL

(71) Applicant: Kenneth Robert Kreizinger, Fort Lauderdale, FL (US)

(72) Inventor: Kenneth Robert Kreizinger, Fort Lauderdale, FL (US)

(\*) Notice: Subject to any disclaimer, the term of this patent is extended or adjusted under 35 U.S.C. 154(b) by 166 days.

(21) Appl. No.: 15/337,138

(22) Filed: Oct. 28, 2016

(65) Prior Publication Data

US 2017/0044759 A1 Feb. 16, 2017

Related U.S. Application Data

(63) Continuation-in-part of application No. 14/738,851, filed on Jun. 13, 2015, now abandoned.

(51) Int. Cl.
| | | |
|---|---|---|
| *E04B 9/00* | (2006.01) | |
| *B32B 27/40* | (2006.01) | |
| *B32B 5/20* | (2006.01) | |
| *B32B 7/12* | (2006.01) | |
| *E04C 2/24* | (2006.01) | |
| *E04C 2/284* | (2006.01) | |

(52) U.S. Cl.
CPC ............ *B32B 27/40* (2013.01); *B32B 5/20* (2013.01); *B32B 7/12* (2013.01); *E04C 2/24* (2013.01); *E04C 2/284* (2013.01); *B32B 2607/00* (2013.01); *E04B 2103/04* (2013.01)

(58) Field of Classification Search
CPC ............ E04C 2/284; E04C 2/24; E04B 2/7448
USPC ............ 52/480, 309.1, 309.5, 745.19, 745.21
See application file for complete search history.

(56) References Cited

U.S. PATENT DOCUMENTS

| | | | | |
|---|---|---|---|---|
| 3,258,889 A | * | 7/1966 | Butcher | E04C 2/386 |
| | | | | 264/263 |
| 3,446,685 A | * | 5/1969 | Neumann | B29C 43/00 |
| | | | | 156/209 |
| 4,054,477 A | * | 10/1977 | Curran | B31D 3/0207 |
| | | | | 156/197 |
| 4,646,494 A | * | 3/1987 | Saarinen | B27B 1/00 |
| | | | | 52/232 |
| 4,914,883 A | * | 4/1990 | Wencley | E04C 2/386 |
| | | | | 156/79 |
| 5,417,023 A | * | 5/1995 | Mandish | E04B 2/58 |
| | | | | 52/309.14 |
| 5,425,908 A | * | 6/1995 | Merser | B27G 11/00 |
| | | | | 156/78 |
| 5,765,330 A | * | 6/1998 | Richard | E04C 2/386 |
| | | | | 52/265 |
| 6,931,813 B2 | * | 8/2005 | Collie | E04B 7/063 |
| | | | | 52/702 |

(Continued)

*Primary Examiner* — Basil Katcheves

(57) ABSTRACT

Frame supported panels with an increased load carrying capacity derived from inducing newly discovered conditions on panels made from weaker, lighter and thinner materials. The fixed/continuous/dropped condition can increase a panel's load capacity many times based on the panel's interaction with frame members. This enables foam panels, for example, to be used in structural applications. It also enables polyurethane foam with any cladding to provide a comprehensive, structural building panel that provides a finished exterior, continuous and cavity insulation, an air, moisture and vapor barrier and increased uplift resistance while eliminating condensation and thermal expansion/contraction.

19 Claims, 10 Drawing Sheets

(56) References Cited

U.S. PATENT DOCUMENTS

| | | | | |
|---|---|---|---|---|
| 8,696,966 | B2* | 4/2014 | Smith | B29C 39/10 264/261 |
| 8,863,458 | B2* | 10/2014 | Noonan | E04B 1/7604 52/407.3 |
| 2003/0033774 | A1* | 2/2003 | Porter | B32B 5/18 52/309.7 |
| 2008/0313985 | A1* | 12/2008 | Duncan | E04B 7/20 52/309.1 |

* cited by examiner

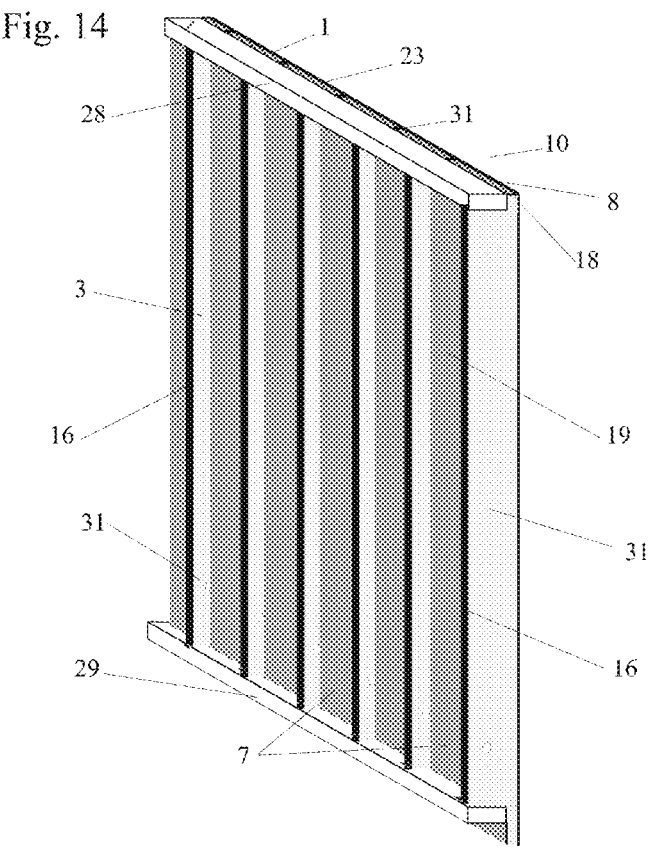
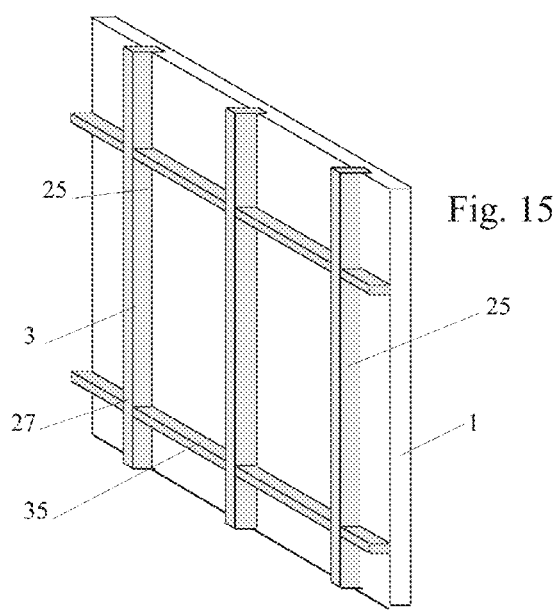

Fig. 16
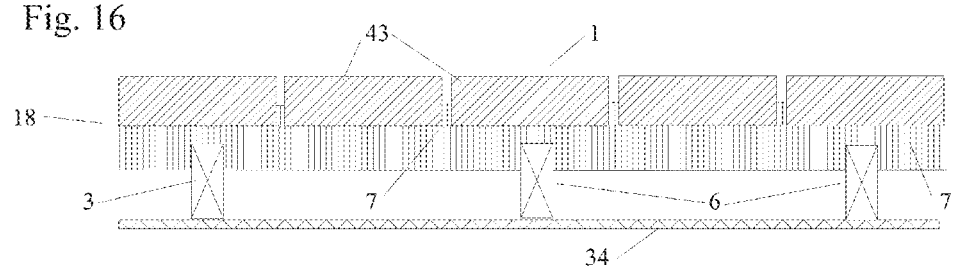
Fig. 17
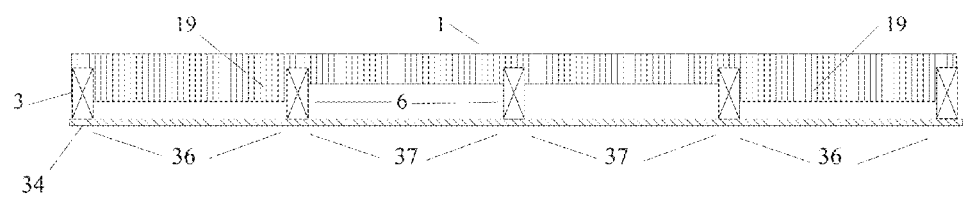
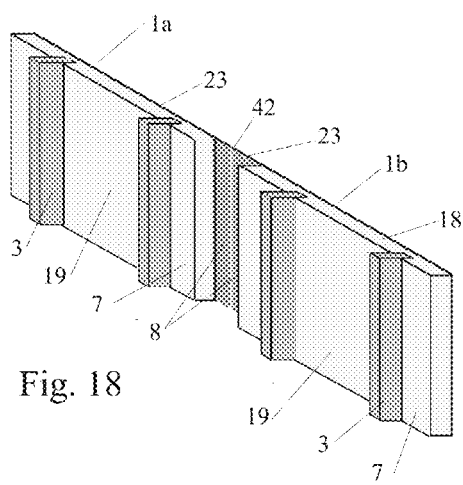
Fig. 18
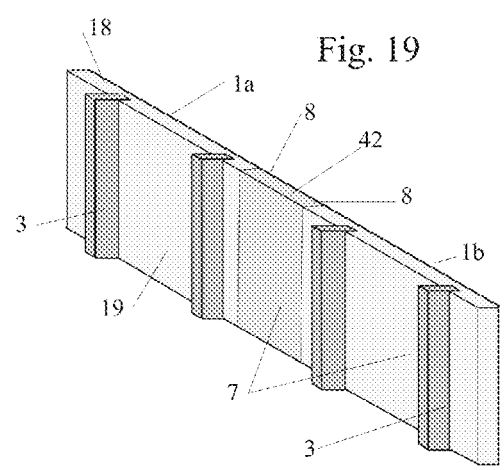
Fig. 19

Fig. 23
Fig. 24
Fig. 25
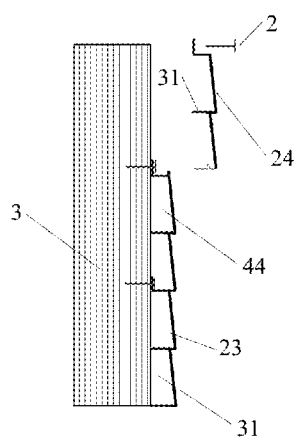
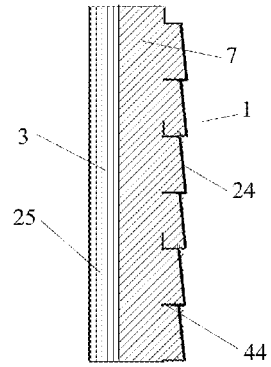
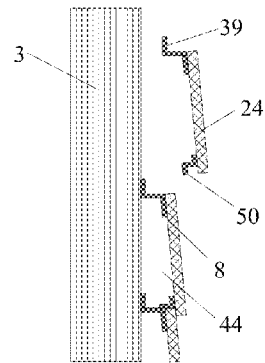
Fig. 26
Fig. 27
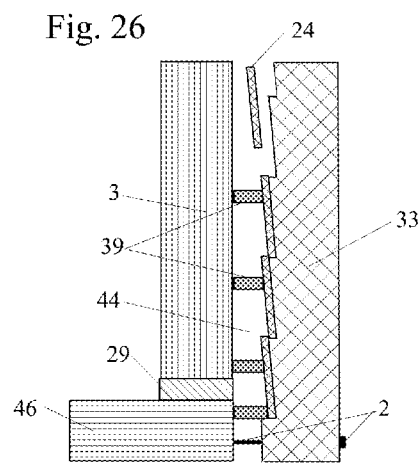
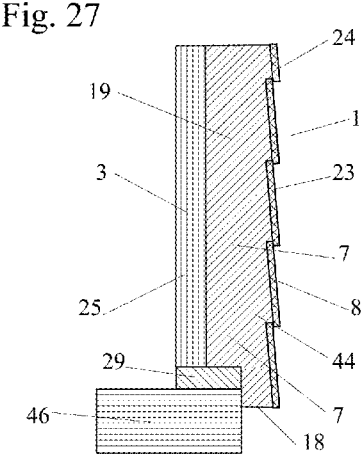

STIFFENED FRAME SUPPORTED PANEL

CROSS REFERENCE TO RELATED APPLICATIONS

This application is a continuation-in-part of application Ser. No. 14/738,851, filed Jun. 13, 2015, and which claims the benefit of the filing date of U.S. Provisional Application No. 62/018,551 filed Jun. 28, 2014 and 62/033,420 filed Aug. 5, 2014, all of which above cited applications are incorporated herein by reference.

INVENTION BACKGROUND

The inventive subject matter comprises is a frame supported panel utilizing four new conditions that enable weaker, lighter and thinner panels to be made stiffer and more versatile by re-configuring the panel's shape and/or by sufficiently bonding the panel to frame members. These conditions substantially increase the stiffness and load strength of these panels by many times for a dramatic increase in load carrying capacity.

There has been a long felt need to increase a panel's load capacity at little or no cost and especially that of foam or foam composite panels used as building panels for walls and roofs. Since many weaker, lighter and thinner panels have desirable properties there is a need to make them structural in order to consolidate these desirable properties into a structural product. This is especially true for polyurethane foam panels which can provide an air, vapor, moisture and thermal barrier, eliminate condensation, decrease thermal contraction and expansion and increase uplift resistance. As such, making polyurethane foam structural would provide a most comprehensive building panel.

Increasing load capacity of panels has typically been accomplished by changing the panel's design with stronger or thicker materials, by using stronger material shapes or by shortening the span between frame members, all of which have limitations and/or increase the panel's costs. In addition, it is well known that a beam or panel in a continuous condition over two or more same sized spans can carry more than a 100% increase in load capacity as compared to the same panel over a single, same sized span.

A continuous condition occurs when a beam or panel is continuous over two or more spans created by spaced apart supports or frame members. In this case the increased load capacity is caused by a reaction from a portion of a panel over one span to a sufficiently large force or load applied to the same panel over an adjacent span. As a load is applied to one span, the panel over the adjacent span(s) resists the load causing the panel to have an increased load capacity. As a result, plywood, form boards and walers all have an increased load capacity when they are continuous over two or more same sized spans. The continuous condition has only been applied to panels that are entirely above the frame members. In other words the entire continuous configured panel is above the plane created by the top edge of adjacent frame members bearing the panel. As such, it is unknown how the load capacity of a continuous panel is affected if a portion of the panel is thickened and dropped below this plane.

It is well know that the continuous condition has inside and outside spans and the insides spans have an inherently higher load capacity than the outside spans. This increased load capacity is presently wasted since most panels have only one or two inside spans and the panel's load capacity is determined by it's weakest span, which is the outside span. This is an unrecognized problem and a need exists to utilize this wasted load capacity.

The continuous condition is derived from fundamental beam theory which is over 100 years old. This theory also teaches that a beam subjected to a fixed boundary condition can have a its load capacity increased up to 400%. Traditionally, a fixed boundary condition exists when the ends of a beam over a single span are fixed as opposed to being simply supported. In order to adequately fix the ends of a beam to prevent it from rotating, the entire perimeter of each end must be fixed to the frame members which only occurs if the beam is fixed to the frame member's sides, as opposed to their top. Fully fixed ends prevents beam rotation to enable the beam to use its full potential strength.

While fundamental beam theory's fixed boundary condition suggests that a material used as a beam can have its load capacity increased by 400%, the theory is silent as to its practical application, techniques and the materials to which it is applicable. Since beams are structural components, the materials typically considered for use as beams are also structural such as steel, other metals, wood and reinforced concrete. Given that such materials are rigid and have a high modulus of elasticity, it has not been known whether the fixed boundary condition can be applied to pliable, soft or otherwise weaker materials such as foams.

Despite the fact that mathematical exercises predicting an increased load capacity from a theoretical fixed boundary condition are widely known, there are few techniques by which to apply the theory and these are limited to steel, other metals and reinforced concrete. Beyond these materials there are no known techniques for attaining a 400% increase in load capacity in most other materials. As a result the practical application of the fixed boundary condition theory is unknown on most materials.

Of the two conditions, the continuous condition is widely practiced whereas the fixed boundary condition remains mostly theory. The continuous condition is the most common connection of a panel to any type of solid or framed structure. It is extensively used to attach sheathings, claddings, decks, coverings, etc. for buildings, furniture and other applications and for a variety of reasons. One important reason the continuous condition is so widely used is that it provides a continuous planar surface over frame members. On the other hand, a fixed boundary condition does not provide a continuous planar surface since its entire end perimeter theoretically needs to be fixed to the side of frame members. As such, the sole appeal of the fixed boundary condition is its theoretical increase in load capacity, which has been of little value since increasing load capacity is easily accomplished by increasing the thickness of a continuous conditioned panel. For example ⅝ inch thick plywood has about twice the load capacity as ½ inch plywood over the same span. Therefore, with such an easy and inexpensive solution to increasing a panel's load capacity there is no motivation to make the fixed boundary condition useful.

It is well known that a fixed boundary condition can be induced on steel beams by either welding or with steel bolts. This is not the case with fasteners and adhesives used to fix non-metal materials to a frame. Prior art demonstrates that some increase in load capacity has been attained using fasteners and adhesives to fix wood to a frame, although nowhere near the 400% theoretical increase possible with a fixed boundary condition. Since the success with attaining an increase in load capacity by fixing wood to a frame is severely limited as compared to fixing steel, the likelihood of attaining an increase in load capacity by fixing a much weaker material such as a foam to a frame was unexpected.

Composite action has been widely applied to wall, floor or roof assemblies, where increased load capacity or greater structural integrity of the frame members, assembly or diaphragm has been recognized by adequately bonding a sheathing to the frame members. It is also well known that polyurethane foam can be used to bond sheathing or claddings to frame members and thereby reduce racking and increase the structural integrity of an entire structural wall or roof section. However, no disclosure shows whether or not such bonding can increase the load capacity of the sheathing itself between frame members.

It is well known that structural building panels, such as plywood sheathing, require a minimum load capacity and therefore determining load capacity is fundamental to the building panel's design. For 50 years polyurethane foam has been adhesively bonded to more rigid materials and used as building panels that required the determination of the panel's load capacity in order to meet building codes and be permitted for use. In many of these cases the polyurethane foam was also adhesively bonded to frame members. However, in no case has it been recognized that bonding polyurethane foam to both the rigid material panels and to the frame members results in an increased load capacity to the polyurethane foam/rigid material composite panel. Nor has it been disclosed that polyurethane foam itself has an increased load capacity induced solely by its bond to frame members.

Moreover, polyurethane foam has been used extensively throughout the world as thermal insulation installed by bonding it to sheathing, creating a composite panel, and simultaneously bonding that composite panel to studs or trusses. Yet it has been unrecognized that this same procedure produces a continuous composite panel having a dropped section (polyurethane foam) between the studs or trusses that is bonded to frame members in a possible fixed boundary condition. Despite literally thousands of people, who have researched, designed, marketed, applied or otherwise worked with polyurethane foam in this way, no one has recognized that polyurethane foam itself or as part of a composite panel bonded to frame members can increase the panel's load capacity. Instead, the prior art is either silent about a panel's load capacity or teaches increased load capacity of the entire frame diaphragm rather than of the panels themselves. For example:

U.S. Pat. No. 3,258,889 (Richard A. Butcher) discloses a structural wall comprised of polyurethane foam bonded to the back of an interior wallboard and to the sides of studs and teaches added stiffness of the framed wall that enables the use of thinner panels and lighter frame members. U.S. Pat. No. 3,641,724 (James Palmer) discloses a wall section comprised of an exterior cover bonded to the sides of stud members by a polyurethane foam that increases the strength of the entire structure. U.S. Pat. No. 4,471,591 (Walter E. Jamison) discloses a wall assembly with an exterior section comprised of polyurethane foam bonded to sheathing and to the sides of studs. U.S. Pat. Nos. 4,748,781 & 4,914,883 (Stanley E. Wencley) discloses polyurethane fillets bonding a panel to frame members to provide an increased strength bonded structure.

U.S. Pat. No. 5,736,221 (James S. Hardigg, et al) discloses two half panels with each having a face and a web molded to the face's backside and the webs bonded together to provide a panel having bending strength in all directions. U.S. Pat. No. 8,397,465 (Jeffrey M. Hansbro et al) discloses a wall assembly comprised of polyurethane foam panels bonded to the sides of structural members (studs) and to foam boards continuous over the structural member's edge. U.S. Pat. No. 8,696,966 (Jason Smith) discloses a method of fabricating a wall structure whereby polyurethane foam is applied against a form and the foam expands to become a panel bonded to the edges and sides of support members (studs) within a wall frame. WO/2013/052997 (John Damien Digney) discloses a composite panel system reinforced with wire mesh and comprised of a structural cladding spaced apart from and bonded to a studded frame with polyurethane foam that is between and continuous over the studs.

US 2014/0053486 (Anthony Grisolia et al) discloses a wall structure including support members inside the frame (studs) and a polyurethane foam panel both continuous over and between the support members. US 2014/0115988, US 2014/0115989 and US 2014/0115991 (Michael J. Sievers, et al) discloses a wall assembly of a frame assembly with vertical members (studs) and an insulating foam layer disposed between and on top of the vertical members. US 2014/0174011 (Jason Smith) discloses a method of fabricating a wall structure comprised of bonding polyurethane foam to the edge and sides of frame members. US 2015/0093535 (James Lambach et al) discloses a framed panel with a polyiso board continuous over frame members and bonded to the sides of frame members with polyurethane foam.

None of the above or other prior art disclose that a continuous conditioned foam or foam composite panel has an increased load carry capacity solely due to a bond with frame members. Nor does the prior art disclose that there is sufficient rotational resistance in place to enable the panels to carry a larger load. Nor does the prior art disclose that a dropped section between frame members can increase the load capacity of a continuous conditioned panel. Nor are fillets, used as dropped sections, known for their ability to shorten a span so as to increase a panels' load capacity. Nor has it been disclosed that polyurethane foam can be used to create large, continuous panels over many spans to take advantage of the inside span's inherent increased load capacity.

Despite bonding foam or foam composite panels to frame members and panels with a continuous/dropped configuration used extensively for decades as building panels that required the determination of the panel's load capacity, none of the new conditions of the inventive subject matter have been previously disclosed as a bases for increasing a panel's load capacity. As such, it has not been obvious by a person of ordinary skill in the art to combine a panel's continuous condition with a fixed boundary condition to increase the panels load capacity. Nor has it been obvious to add a dropped section to a continuous conditioned panel to increase the panel's load capacity. Nor has it been obvious that rotational resistance is necessary to facilitate increases in load capacity.

The problems to be solved by this inventive subject matter are first: to increase the load carrying capacity of panels comprised of weaker, lighter and thinner materials, and second: to utilize the presently unrecognized increased load capacities of a panel's inside spans.

SUMMARY OF INVENTION

The inventive subject matter is the application of four new conditions on weaker, lighter, thinner and less costly panels to enable them to become stiffer, stronger and more versatile by re-configuring the panel's shape and/or by sufficiently bonding the panel to frame members. The effectiveness of these new conditions is inversely related to a panel's flexural stiffness in that the smaller the flexural stiffness the greater the effect the conditions have in increasing a panel's load capacity. Panels with the lowest flexural stiffness can have thousands of times increases in load capacities. As a result, non-structural materials, such as foam insulation, may be converted into structural applications to facilitate a new generation of multi-functional structural panels.

Due to the lack of literature on the application of fixed boundary conditions to beams or panels made of materials much weaker than steel or concrete, testing was initiated to study the effects of a fixed boundary and continuous condition on the load carrying capacity of foam panels and thin wood panels supported by a frame. The object was to determine whether these boundary conditions are applicable to such materials and if so, to what extent they affect the various material's load carrying capacity when used as panels. Several configurations were tested leading to the discovery of the four new conditions and their dramatic impact on increasing a panel's load capacity.

While the continuous condition is well known, combining it with the fixed boundary condition is only known for a limited number of materials, all of which have a high modulus of elasticity. Specifically, continuous panels made of steel (metals), reinforced concrete and wood have all been sufficiently fixed to frame members such that some degree of increased load capacity was attained from the combination of the continuous and fixed boundary conditions. However, no prior art combines the continuous condition with the fixed boundary condition on low modulus of elasticity materials such as foam or foam composite panels. In addition, despite substantial prior art showing a polyurethane foam composite panel in a continuous condition and bonded to frame members, either the configuration didn't induce a fixed boundary condition or if it did, it was unrecognized. Finally, the techniques used on steel, reinforced concrete and wood to attain a fixed boundary condition are not transferable to foam.

The continuous/dropped configuration has been used for such things as dropped ceiling tiles although it has not been recognized as a condition that can increase a panel's load capacity. The continuous/dropped configuration and condition has the top or outside section of a panel continuous over one or more spaced apart frame members while the bottom or inside section of the panel is thickened and dropped between the sides of frame members. This is distinguished from a continuous panel which is completely above the frame members or more precisely above a plane or a perimeter created by the frame member's top edges that are supporting the panel. The term "top edge" refers to a side of a frame member where a panel physically sits directly on top of or a panel is directly continuous over, such as the 1.5" side of a typical 2×4 stud or truss to which sheathing is nailed. A continuous/dropped panel may or may not be bonded to frame members. If it is sufficiently bonded to frame members to induce a fixed boundary condition, it becomes a fixed/continuous/dropped condition, another new condition of this inventive matter.

The continuous/dropped configuration is the reverse of known dropped panels configurations used to increase the panel's load capacity. For example, to strengthen concrete floor panels a dropped or thickened section is added over the columns or beams, such as a capital, and a thinner section is over the spanned area. While the continuous/dropped panel configuration has been shown in numerous prior art disclosures, such as polyurethane foam bonded to the inside of sheathing, it's ability to increase the panel's load capacity has gone unrecognized for at least 50 years.

As used in this disclosure the term load capacity, also known as load carrying capacity, is a panel's maximum load it can carry, or force it can withstand, over a given span before the panel deflects more than a given amount. As the amount of load increases on the panel over the span the panel reacts by rotating which causes the panel to bend or if the panel material is too brittle the panel will crack or bend and crack. Since some materials are more prone to cracking instead of bending under a load or will crack only after a minor load, deflection as herein defined to include both bending and cracking. Due to the problems caused by excessive deflection, load capacity is an important element of almost all frame supported panels, regardless of application. In many applications there is a maximum, allowable amount of deflection for a given load. For example wall panels may be required to carry a minimum lateral load of 40 psf (pounds per square foot) without deflecting more than L/240. For example, if span length "L" is 16 inches, the panel cannot deflect more than 16/240 or 0.067 inch when the given 40 psf load is applied. A span is the distance between spaced apart frame members and therefore is both a length and a space. The term "one or more spans" refers to either a single, undivided space between frame members or to a multitude of spaces separated from each other by multiple spaced apart frame members.

A panel's load capacity is determined by its material composition, shape, length of span and allowable deflection. For purposes of this disclosure, a panel's material composition and shape comprise its "flexural stiffness" which is defined as EI ("E", a material's modulus of elasticity, multiplied by "I", the panel's moment of inertia). Flexural stiffness refers to a panel's material and the shape of its cross section and is stated in lbs-in$^2$.

Formulas have been developed to predict deflection for a given load over a given span for beams with a simply supported condition, a continuous condition and a fixed boundary condition. These formulas have been found applicable to panels where the span is determined by two spaced apart frame members, similar to beam support members. The formulas provide a way to mathematically compare a panel's predicted load capacity under different conditions.

A simply supported panel is over a single span with opposite ends of the panel supported by spaced apart frame members without any sufficient means for the panel to resist rotation. The panel may be unbonded or bonded to the frame members, although any such bond, such as nails, is insufficient to induce a fixed boundary condition on the panel and thereby the panel is unfixed. The maximum deflection formula for a simply supported condition is $d=5\,wL^3/384EI$ where "d" is the amount of deflection in inches, "w" the uniformly distributed load, "L" the span length in inches, "E" the material's modulus of elasticity and "I" the panel's moment of inertia. This formula provides the basis for determining a simply supported panel's load capacity per inch of panel to frame member interface as: $w=76.8dEI/L^3$ for a uniformly loaded panel.

A simply supported panel's load capacity can be increased by subjecting the panel to conditions that enable the panel to stiffen and thereby increase its load carrying capacity to support greater loads for a given deflection. One well known condition is a continuous condition whereby a panel is continuous over the top and bears on the top of three or more spaced apart supports, i.e. frame members, and is thereby continuous over two or more spans. The continuous condition increases a panel's load capacity by a reaction from the part of a panel over one span to a force or load applied to the same panel over an adjacent span. As a load is applied to one span, the panel over the adjacent span(s) resists the load causing the panel to have an increased load carrying capacity. The amount of this adjacent span's load resistance is dependent upon the amount of load on the adjacent span, which can be anywhere from the weight of the panel itself over the adjacent span to some amount of added load on the panel over the adjacent span(s). In addition, the resistance can further be affected by how the added load is distributed over the adjacent span, for example is the load uniformly distributed load or applied at one particular point over the span.

A panel that is continuous over and supported by spaced apart frame members that create two or more spans, is a continuous panel in a continuous condition and has an increased, continuous conditioned load capacity, over each individual span, that is greater than the panel's simply supported load capacity. The continuous conditioned load capacity shall be determined with no added load on the panel over the adjacent span(s). In those cases where a uniform load is applied over several spans of a panel, the load capacity over each individual span shall be herein called the uniform load conditioned load capacity and determined by measuring an individual span's deflection under a uniformly distributed load when the same uniformly distributed load is placed on adjacent span(s). Continuous panels may be unbonded or bonded to the frame members although any such bond is insufficient to induce a fixed boundary condition on the panel and thereby the panel is unfixed. As such all continuous panels are unfixed and a continuous conditioned load capacity only applies to an unfixed continuous panel. Furthermore, To support a panel means the panel bears on or is held up by supports, a frame or frame members and to support a load means to carry or bear a load.

For clarification purposes, an increased load capacity or an increase in load capacity is a load capacity that has been increased from some previous amount of load capacity and results in a greater load capacity. For example a continuous conditioned panel has an increased load capacity above that of itself in a simply supported condition and thereby has a new, greater load capacity. Also, when a continuous panel over several spans is herein compared to a simply supported panel, the continuous panel's length is assumed to be shorted to that of the simply supported panel over a single span, while the panel's flexural stiffness, span length and load remain the same.

The maximum deflection formula for a continuous conditioned panel over two equal spans with uniformly distributed loads is: $d=wL^3/185EI$ and therefore the panel's continued conditioned load capacity per inch of panel to frame member interface can be determined by the formula: $w=185dEI/L^3$. Comparing this to the simply supported formula shows that a continuous condition induces an increase in load capacity of about 141% above that of a simply supported panel ((185−76.8)/76.8). As such, a panel continuous over two spans has a load carrying capacity increase of 141% over the same shortened panel has over the same single span. This 141% increased capacity can be used to compare the increased load capacity of a uniform load conditioned panel over a span to the panel's simply supported load capacity. The amount of increased capacity and formula may vary depending upon the circumstances such as unequal spans, different loads, additional support, etc.

In those cases where a formula is non-existent or some variable is unknown, load testing can be used to determine the load capacity. A load test is well known is the art and comprises the measurement of a panel's deflection resulting from a load placed on the panel section that is over an individual span. The degree of either panel bending or panel cracking can be compared to that of another panel over the same individual span as long as there is consistency of the span, load arrangement and other well known variables that can affect deflection and load capacities. An uplift resistance test is not a load test as defined herein since it does not measure panel deflection over individual spans.

Once the load capacity of a certain panel configuration over a given span is known from load testing, the load capacity of other panels so configured and over the same span will also be known and thereby the panel's load capacity is established for any purpose. Any change in the panel's configuration or span that is known to increase the panel's stiffness shall also be known to increase the panel's load capacity to some amount greater than the panel's load capacity prior to the change. For example if a panel has a load capacity of 50 psf over a 24 inch span, it will have at least a 50 psf load capacity over a 16 inch span. Likewise if a panel with 2 inch thick foam over a span and bonded to frame members has a 30 psf load capacity the same panel with the same foam thickened will have at least a 30 psf load capacity over the same span.

Another uniform load condition occurs when a panel is continuous over three or more spans and the two outer spans have greater deflection than the spans in a two span condition. This occurs because the center or inside span is reacting to loads on outside spans on both sides which causes it's reaction to be split between two adjacent spans and thereby less effective than if reacting to a single span in a two span condition. On the other hand, since the inside span is supported by spans on both sides, it has a much higher load carrying capacity. As such, a panel continuous over three equal spans has a uniform load condition increase of only 89% on the outside spans and a much higher increase of about 285% on the inside span over a simply supported panel. A panel continuous over four or more equal spans has a 100% increase in load capacity for its outside spans and about a 212% increase in load capacity for its inside spans. A panel continuous over five or more equal spans has a 90% increase in load capacity for its outside spans and about a 230% increase in load capacity for its inside spans over a simply supported panel. These increases are derived from well known formulas that determine the maximum deflection on continuous panels with uniformly distributed loads over equal spans.

The third beam theory condition is a fixed boundary condition which traditionally has been applied to where a panel is over a single span with two opposite ends fixed to the sides of the supporting frame members to prevent the panel from rotating. A fixed boundary beam has traditionally been depicted as being fixed to the sides of frame members, suggesting that fixing the entire end perimeter is required to prevent rotation. A fixed boundary panel has traditionally been known to have five times the load capacity of the same simply supported panel which is a 400% increase. The maximum deflection formula for a fixed boundary conditioned panel is: $d=wL^3/384EI$ and the formula for the load capacity per inch of panel to frame member interface is: $w=384dEI/L^3$.

While a fixed boundary condition theoretically has a 400% increase in load capacity over a simply supported panel, it is a misnomer in that testing showed that the increase is really a variable from ranging from a 1% to 400%, depending upon the sufficiency of the panel to frame member bond. Therefore, for purposes of this disclosure, the term "fixed boundary condition" is defined as sufficiently fixing a panel to frame members to induce some increase in load capacity up to 400% while a "fully fixed boundary condition" is one that has attained the full 400% increase in load capacity.

In order to compare the effectiveness of the new conditions, it is necessary to compare their load carrying capacities with those of known conditions and specifically to the simply supported, the continuous conditioned panel and the uniform load conditioned panels. Where applicable, the above uniform load conditioned percentage increases can be used to determine the uniform load conditioned load capacity from a known simply supported load capacity. Or, load testing can be used on different continuous conditioned panels with a variety of different configurations of frame members, loads, spans, etc. Once a panel's simply supported and/or continuous conditioned load capacity is determined, it can be compared to any increased load capacity induced on the same panel span by the new conditions. For example a continuous panel may be load tested both before and after a fixed/continuous/dropped condition is induced on the same continuous panel. The load capacity induced on a panel by the various new conditions will have to be determined by load tests until such time formulas may be developed that consider all of the variables.

While the techniques for applying both the simply supported and the uniform load condition to a panel of any material are obvious, "fixing" a panel is much more ambiguous, especially when applied to different materials and the historic inference that the entire perimeter of each panel end must be fixed to the side of frame members. Fixing a panel or a fixed panel is where a sufficient bond exists between the panel and frame members to induce a fixed boundary condition on the panel. The object of fixing a panel is to prevent the panel from rotating. Given that different materials have different properties it is obvious that techniques to prevent rotating differ from material to material. For example, the techniques used to fix a steel or a concrete panel are very different from those used to fix a foam panel.

As such, both the simply supported and the continuous conditions are easy to apply and widely used. The fixed boundary condition, on the other hand, is little used outside of structural steel frames, reinforce concrete, reinforced resins and to some degree wood applications. Structural steel connections can be fixed by welding or multiple bolts to prevent rotation while reinforced concrete and reinforced resin connections are inherently fixed. Wood has had limited success in that only small increases in load capacity have been disclosed to date.

Beyond this there is a lack of prior art concerning the practical application of the fixed boundary condition to other materials, especially materials having a low modulus of elasticity or panels having a low flexural stiffness. In addition, given that steel, reinforced concrete and reinforced resin all have a higher modulus of elasticity than wood, and wood has had much less success in attaining a fixed boundary condition, this suggests that the fixed boundary condition's application may decrease with a material's modulus of elasticity. As such, it appears the fixed boundary condition is fully applicable to steel and reinforced concrete and only partially applicable to wood and by extension inapplicable to foam. For these reasons the ability to increase the load capacity of a foam with a fixed boundary condition was unexpected. Substantial testing was undertaken as part of this disclosure and unless otherwise noted all testing herein referred to was done for this disclosure. Testing revealed that a fixed boundary condition is not only applicable to weak, light and thin materials but is easily attained through certain material appropriate techniques. Through testing it was found that a fixed boundary condition was actually easier to induce on materials having a low modulus of elasticity or panels having a low flexural stiffness than on panels with much higher flexural stiffness. In fact, techniques were developed that enable far more than a 400% increase in load capacity on weaker material panels so that a material such as foam can be transformed into a multi-functional structural panel with a load capacity greater than plywood. Testing also found that a fixed boundary condition may be obtained by sufficiently bonding a panel to the frame member's sides and/or top edges and that it also applies to continuous panels.

Several findings were made including that an adhesive bond alone or in conjunction with fasteners does not necessarily produce an increase in a panel's load capacity. Rather, in order to attain any degree of a fixed boundary condition on a panel, a sufficiently high bonding strength must be present on each of at least two spaced apart frame members creating the span and the sufficiency of the bonding strength is dependent upon the panel's flexural stiffness. The higher the panel's flexural stiffness the higher the required bonding strength to induce a fixed boundary condition, Moreover, the required bonding strength was also found to be a multiple of the load supported over a span and the greater the span the greater the multiple. Therefore, as a panel's load capacity decreases, the bonding strength must be increased. As a result of these and other findings, techniques were developed to obtain sufficiently high bonding strengths.

As used herein, a bond or bonding is something that binds, fastens, confines, or holds together and may also refer to using an adhesive, cementing material, or fusible ingredient that combines, unites, or strengthens and also to a bonding technique such as thermal bonding. Adhesive refers to both a substance and/or technique that causes something to adhere to a material or that is designed to adhere to produce an adhesive bond. Bonding strength is herein defined as the amount or degree of bond between a panel and frame members and is typically measured in pounds per interface or contact area.

Once testing provided a better understanding of a fixed boundary condition and possible techniques, four new conditions were developed to make the fixed boundary and the continuous conditions more effective and applicable to other materials. Each of these four new conditions provide a panel with an increased load capacity. The first new condition is called the fixed/continuous condition and it combines the fixed boundary and the continuous conditions. The second new condition is the continuous/dropped condition which increases the load capacity of panels by adding a dropped section to the panel over the span. The third new condition is the fixed/continuous/dropped condition and it combines the fixed boundary and the continuous/dropped conditions. These new conditions enable weaker, lighter and thinner panels to easily attain as much as a 1,000,000% or more increase in load capacity and thereby may be substituted for panel materials having a much higher modulus of elasticity. The fourth new condition is the enhanced continuous condition which capitalizes on the much higher load capacities of the inside spans The first new condition, the fixed/continuous condition, combines the fixed boundary and the continuous conditions and is most effective on low modulus of elasticity materials such as foam. The fixed/continuous condition is a panel supported by spaced apart frame members with a continuous section that is continuous over and fixed to the top edges of the frame members. Unlike the fixed boundary or the continuous conditions, the fixed/continuous condition may be induced on a panel over a single or multiple spans. The fixed/continuous panel is sufficiently bonded to the frame member's top to induce a fixed boundary condition and is continuous over at least part of the supporting frame members. Although the panel is bonded to the frame member's top as opposed to it's side, which will limit the degree of fixed boundary condition attained, combining the conditions can more than compensate for such reduction since more than a 400% increase in load capacity is possible. As a result, a fixed/continuous conditioned panel has a substantial increase in load capacity over that of a continuous panel.

The second new condition, the continuous/dropped condition, occurs when a panel has a continuous section and a dropped section which combine to form a thickened section. The continuous/dropped condition is a panel supported by spaced apart frame members with a continuous section that is continuous over the frame member's top edges and a dropped section that is between the frame member's sides and in contact with the continuous section. The panel is not fixed to the frame members. The continuous section is that part of the panel that is continuous over frame members and over spans created by spaced apart frame members supporting the panel and thereby the panel has a continuous condition. All continuous panels have a continuous section which is comprised of one or more materials that may or may not be in layers although the materials are attached to one another, but not necessarily adhesively bonded to one another. The dropped section is that part of the panel below, behind or otherwise adjacent to the continuous section and is between the sides of frame members and thereby below or behind the plane created by the frame member's top edges. It is the dropped section and its relationship with the frame members that provide the increased load capacity above that provided by a continuous condition. While the continuous condition relies solely upon the rotational resistance provided by a portion of the panel over an adjacent span for its increase in load capacity, the continuous/dropped panel relies upon a thickened panel section over the span and, where it exists, the rotational resistance from an adjacent span. The continuous/dropped condition may be applied to both a simply supported panel and a continuous conditioned panel by adding a dropped section and therefore the simply supported panel and the continuous conditioned panel may be called continuous sections.

Sufficiently bonding a continuous/dropped panel to frame members induces a fixed boundary condition on the panel that further increases a panel's load capacity. This combination is called a fixed/continuous/dropped condition and may be induced on a panel over a single or multiple spans. The fixed/continuous/dropped condition is a panel supported by spaced apart frame members with a continuous section that is continuous over the top edges of the frame members and a dropped section situated between the frame member's sides and in contact with the inside of the continuous section. The panel is fixed to the top edges and/or the sides of the frame members. The dropped section may be situated in any number of spans in a continuous dropped or a fixed/continuous/dropped condition. The term one or more dropped sections shall mean that either a single dropped section may be situated in any number of the spans or more than one dropped sections, such as two fillets, may be situated in any number of the spans. A major advantage of both the continuous/dropped condition and the fixed/continuous/dropped condition is that a panel's load capacity can be increased without increasing the structural section's thickness. Another advantage is that adhesively bonding a continuous panel to frame members greatly stiffens the panel without having similar, uniformly distributed load on adjacent spans. Of all the new conditions, the fixed/continuous/dropped condition can provide the greatest increase in load capacity by 1,000,000% or more in some situations. This is due in part to the additional bonding area made available by the dropped section's interface with the frame members, which can substantially increase the degree of fixed boundary condition induced on the panel. It was also discovered that fillets can be used as dropped sections to both further increase the bonding area and to effectively shorten the span which greatly affects a panel's load capacity.

For example, a fixed/continuous/dropped condition induced on a one inch continuous panel with a load capacity of about 2.9 psf over a 14.5 inch span can be increased about 500% to 17.4 psf by adding a one inch dropped section. A partial fixed boundary condition is also induced causing another two times increase in load capacity to about 34.8 psf. Finally, fillets can be used to effectively shorten the span by two inches to 12.5 inches which increases the load capacity to 64 psf. As a result, the fixed/continuous/dropped condition increased the panel's continuous load capacity by 2200% from 2.9 psf to 64 psf.

The fourth new condition, the enhanced continuous condition, greatly improves the effective load carrying capacity of a panel by increasing the load capacity of the outside spans to correspond to that of the inside spans. Presently a panel's load capacity rating is determined by its weakest section which is the panel's outside spans. Due to span reaction, the inside span's load capacity can be as much as a 220% increase over that of the outside spans, which is wasted since the weakest spans control. By increasing the load capacity of the two outside spans to correspond to its inside spans, the panel has a much higher load carrying capacity rating. While this may be of little value for traditional panels spanning three of four spans, it's exceptionally beneficial to panels created to span six or more spans, since the cost of increasing the outside span's load capacity is negligible as compared to increasing the entire panel's load capacity. By using polyurethane foam as part of a composite panel, it is possible to create a single panel with numerous inside spans covering an entire wall, roof or even much of an entire building.

The structural section disclosed herein is a single faced structural section comprised of one or more frame members providing some degree of a frame with one or more panels continuous over the top or outside of the frame and, where necessary, rotational resistance members attached to the bottom or inside of the frame members. As used herein, a frame is comprised of one or more individual frame members that may or may not be in contact with one another and that provide a partial or full border for a panel or structural section. A frame may include individual frame members internal to the border, such as studs between a top and bottom plate and/or frame members external to the border such as rafters extending beyond a top plate. A panel may be cantilevered beyond a frame member or a frame's border. The terms spaced a distance apart or spaced apart frame members shall mean that at least part of the frame member's sides are not in contact with those of an adjacent frame member, or itself, such that a span, i.e. a distance and a space exists between the frame members.

A major finding was that the bonding strength necessary to induce a fully fixed boundary condition is a function of the panel's flexural stiffness. The higher the flexural stiffness, the greater the required bond, meaning that ½ inch plywood for example, will require a bond strength many times greater than that needed for two inch foam. This explains why fasteners used to attach wood panels to frame members have little or no impact on increasing the panel's load capacity. It also exposes the ability of low flexural stiffness panels to be much more susceptible to a load capacity increase induced by a fixed boundary condition.

The testing led to several unexpected results such as a typical two pound density polyurethane foam has a sufficient bonding capacity to induce a fixed boundary condition on itself or other foams that increases the foam's load carrying capacity by many times. Prior to this it was unrecognized that polyurethane foam could induce a fixed boundary condition on itself or anything else. Another unexpected result was that a foamed composite panel sufficiently bonded to frame members can induce a fixed boundary condition on the flexural stiffness of the entire composite panel, not just on the foam.

Another unexpected result was that material appropriate fillets can significantly increase a panel's load capacity by several hundred or thousand percent by increasing the degree of fixed boundary condition and/or by effectively shortening the span.

Another unexpected result was that a dropped section can increase a continuous panel's load capacity by several hundred percent.

Another unexpected result is that increases in load capacities induced by conditions are in series, with each subsequent condition a multiple of prior induced conditions such that a panel's load capacity may be increased thousands of times by compounding conditions.

Another unexpected result is that the fixed boundary condition is applicable to foam and other materials having a low modulus of elasticity.

Another unexpected result was that the inducement of a fixed/continuous condition on a panel can increase the panels load capacity to more than the combined 540% increase by the fixed boundary condition (400%) and the continuous condition (140%).

Another unexpected result was that polyurethane foam can splice individual panels into a large, single panel with multiple spans and induce a continuous conditioned structural continuity over the spans to make all but two inside spans that have an inherently higher load carrying capacity that was previously wasted and a previously unknown problem.

It was also found that the bonding strength required for a fully fixed boundary condition was a multiple of the load and the longer the span, the greater the multiple. For example, a panel over a 14.5 inch span may require a bonding strength of 50 to 90 times the load on that span whereas the same panel over a 24 inch span may require a bonding strength over 200 times the load. Again, the higher the material's flexural stiffness and the longer the span, the greater the required bond strength to induce a fixed boundary condition. This also shows that increasing bonding strength can offset a longer span's decrease in load capacity.

Accordingly, one advantage of the inventive subject matter is that weaker, thinner, lighter, more versatile and less expensive materials can be used as structural panels.

Another advantage is that all types of panels can have an increased load capacities of of several times and in some cases several thousand percent increase above the same simply supported panel.

Another advantage is that polyurethane foam bonded to a cladding and frame members can become a comprehensive structural panel that provides a finished exterior, continuous and cavity insulation as well as an air, moisture and vapor barrier, increased uplift resistance and the elimination of condensation and thermal expansion/contraction.

Another advantage is that adding fillets can increase a panel's load capacity by several thousand percent above that of the same simply supported panel.

Another advantage is that a panel can have a substantial increase load capacity without thickening its structural section.

Another advantage is that panels may be created to cover numerous spans to utilize the existing increased load capacity of inside spans which is presently wasted.

Another advantage is that a low cost spray-up process may be used to manufacture comprehensive building panels.

Another advantage is that frame members may be much thinner since the frame member's sides can support a panel and thinner frame members can be supported by the panel's dropped section.

Another advantage is that a prefabricated slotted panel may have its load capacity increased multiple times by simply being sufficiently bonded to frame members.

Another advantage is that thin ribbed panels can be made structurally sufficient and have a substantial increase in load capacity by being filled with and bonded to frame members with polyurethane foam.

Another advantage is that a fixed/continuous/dropped condition can greatly reduce thermal expansion and contraction on susceptible claddings.

Another advantage is that the new conditions induced on a panel act in series such that each incremental increase in load capacity is compounded by the next condition that can increase a panel's load capacity by several thousand percent.

Another advantage is that a polyurethane foam bonding a cladding to frame members creates a composite panel and the induced conditions multiply the entire panel's load capacity as opposed to only the foam's load capacity.

Other objects, advantages and features of the inventive subject matter will be self evident to those skilled in the art as more thoroughly described below.

BRIEF DESCRIPTION OF THE DRAWINGS

FIG. 14 is a combined ribbed panel and a ribbed structural section that has increased load capacity for both the panel and the cladding.

FIG. 15 is a continuous panel with a blocked rotational resistance members.

FIG. 16 is a frame supported fixed/continuous/dropped panel with brick cladding.

FIG. 17 is an enhanced continuous conditioned panel with increased load capacity induced on the outside spans to correspond to that of the inside spans.

FIG. 18 is two individual fixed/continuous/dropped panels with a seam between them.

FIG. 19 is the two panels of FIG. 18 merged into a single structurally continuous panel.

FIG. 23 is ribbed siding being attached to a frame member.

FIG. 24 is the ribbed siding of FIG. 23 bonded to a frame member with polyurethane foam that creates a foam composite panel with increased load capacity.

FIG. 25 is a stud with lapped siding boards attached by a spacer and a clip.

FIG. 26 is a section view of a cladding spacer attaching cladding to a frame member.

FIG. 27 is a section view of FIG. 26 showing a filled in spacing.

Figure 1:
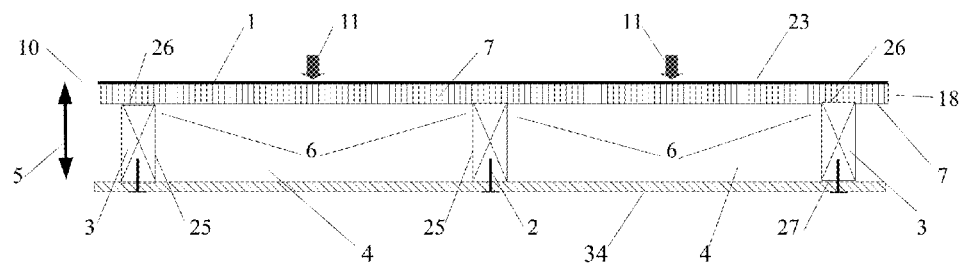
FIG. 1 is a frame supported continuous panel over multiple spans

DETAILED DESCRIPTION ACCORDING TO THE PREFERRED EMBODIMENTS OF THE PRESENT INVENTION

The inventive subject matter is the application of four new conditions on weaker, lighter, thinner and less costly panels to enable them to become stiffer, stronger and more versatile by re-configuring the panel's shape and/or by sufficiently bonding the panel to frame members. The newly discovered conditions are: a fixed/continuous condition, a continuous/dropped condition, a fixed/continuous/dropped condition and an enhanced continuous condition. The effectiveness of these new conditions is inversely related to a panel's flexural stiffness in that the smaller the flexural stiffness the greater the effect the conditions have on increasing a panel's load capacity. As a result, low flexural stiffness and typically non-structural materials, such as foam insulation, may be converted into structural panels to facilitate a new generation of multi-functional structural panels.

Several tests were undertaken on panels made of a low modulus of elasticity materials or panels with a low flexural stiffness. In one test, a simply supported 16 inch wide and three inch thick EPS foam board was load tested over a 16.5 inch span and found to carry 9.3 psf before deflecting about 0.07 inches (0.07 inch deflection 16.5 inches divided by 240). The same 16 inch wide foam board was then glued to the sides of two frame members spaced 16.5 inches apart with a polyurethane foam poured into a 1.25 inch deep by 0.25 inch wide gap between the sides of the frame members and the foam board. When load tested, the EPS foam board carried a uniformly distributed load of 44 psf before deflecting 0.07 inches. As such, the fixed EPS foam board carried 4.7 times, or a 370% increase in load above the simply supported foam board.

The finding that an EPS foam panel's load capacity can be increased about 400% if it is sufficiently bonded, i.e. fixed, as opposed to nailed to frame members is consistent with the fixed boundary condition from fundamental beam theory used to predict deflection. This finding was unexpected since EPS foam has such a low modulus of elasticity as compared to steel and reinforced concrete with which fixed boundary conditions are well known.

The testing continued on the EPS foam board by cutting the 1.25 inch deep adhesive bond along both frame members by about 0.25 inch and then testing for load carrying capacity. When the adhesive bond was cut back from 1.25 inches to a one inch deep bond, the EPS foam board could only carry about a 27 psf load before deflecting to 0.07 inch and when the adhesive bond was further cut to a 0.75 inch deep bond only a 19 psf load was carried. This continued with a 0.5 inch deep adhesive bond supporting a 17 psf load and to a 0.25 inch deep adhesive bond having a 15 psf load carrying capacity, all before deflecting 0.07 inch. Finally, when the EPS foam board was only slightly bonded to the frame members it carried the same load it carried when simply supported.

From this it became evident that the foam board's load carrying capacity was directly related to the degree or the strength of the adhesive bond between the foam board and the frame members. As such, the fixed boundary condition actually has degrees of bonding strength that result in degrees of increases in load capacity. Depending upon the bonding strength the degree of increase in load capacity ranges from zero, where the bond is insufficient to prevent rotation, up to about a 400% increase in load capacity induced by a fully fixed boundary condition. For clarification purposes, a fixed boundary inducing a 400% increase in load capacity is herein referred to as a "fully fixed boundary". Otherwise a "fixed boundary condition" will herein mean that some increase in load capacity is present as induced by the fixed boundary condition.

As such, testing revealed that both a minimum bond must be present and that a direct relationship exists between the bonding strength and the amount of load capacity increase attained by a fixed boundary condition. This means that the degree by which a panel is bonded to the frame members can be predetermined and enables the regulation of the panel's load capacity. It also means that other adhesive materials may be used since the polyurethane foam was used such that the type of adhesive material was irrelevant as long as it's capable of providing a sufficient bond between the foam board, as a panel, and the frame members.

Four types of foam boards were tested: expanded polystyrene (EPS), extruded polystyrene foam (XPS), polyurethane foam (two pound density) and a paper/plastic coated EPS panel. Two pound density polyurethane foam bonded to claddings with and without ribs was also tested, as was plywood up to 0.35 inch and thin plastic. From this testing all of the panels performed similarly and all of the foam panels attained about a 400% load capacity increase, or more, when sufficiently bonded or fixed to the frame members. The 0.35 inch and 0.22 inch thick plywood panels did attain an increased load capacity from the fixed boundary condition, although far below 400%. The polyurethane foam board began as a two part liquid that was poured in place and expanded to bond to the frame members and to the cladding material while transforming itself into a solid panel. The references to calculations and predicted loads as used herein refer to the utilization of the appropriate simply supported, continuous conditioned and fixed boundary conditioned deflection formulas.

Bonding a panel to frame members does not necessarily induce a fixed boundary condition. Rather, a sufficient bond is necessary and testing showed that bonding strength is a crucial factor in the inducement of a fixed boundary condition on a panel to increase its load capacity. Bonding strength is determined by the bonding material's bonding capacity, multiplied by the size of the bonding area between the panel and frame member. For example a polyurethane foam with a 30 psi bonding capacity applied over two square inches of bonding area equals 60 lbs (pounds) of bonding strength between the panel and frame member. Each continuous panel has an interface or contact area on at least the frame member's top edge and along the frame member's sides when a dropped section is present. Interface is the amount of panel to frame member contact area over a section view of the frame member and is stated per inch of the panel to frame member border which is transverse to the interface. For example a 24 inch by 110 inch continuous panel over seven frame members that have a two inch wide top edge and spaced 16 inches apart (spans) has a 24 inch border with each frame member. The interface is two square inches, the width of the top edge, for each of the 24 inches of border. If the panel has a one inch dropped section on both sides of the frame members, the interface increases to four square inches per inch of border. The bonding area is the amount of the two or four square inches respectively that is actually sufficiently bonded.

In order to carry or support an increased load using the fixed boundary condition, it is important that the panel be "fixed" to the frame members. Fixed is herein defined as a sufficiently high bond or bonding strength between the panel and frame members that induces a fixed boundary condition on the panel. Sufficiently bonded is herein referred to as being fixed. Bonding technique is any bonding material and/or technique that can be used to prevent a panel from rotating. Bonding materials include any type of adhesive or other material that can cause a bond between a panel and frame member. An example of a technique is a panel's dropped section, tightly fitted between the sides of two frame members that prevents the panel from rotating. Bonding techniques are material appropriate in that some bonding techniques only apply to certain panel and/or frame member materials. An adhesive or an adhesive bond are types of bonding technique.

In order to achieve a sufficient bond it is important that the bonding technique has a minimum bonding capacity of at least 10 psi and preferably at least 15 psi and more preferably at least 20 psi and even more preferably at least 25 psi. The problem with bonding capacities of less than 10 psi is that they require larger bonding areas to induce a sufficient bond in most situations. Since steel can be a panel material and welding is a bonding technique, the maximum bonding capacity is that of a steel weld on stainless steel or about 60,000 psi. Testing found that the bonding strength required for any degree of a fixed boundary condition is a multiple of the load to be carried and the multiple increases as the span increases. In one test two, two inch polyurethane foam panels were bonded to the sides of frame members with a 240 lb bonding strength. The first panel had a 14.5 inch span and the second panel a 22.5 inch span. The 14.5 inch panel carried a fully fixed boundary condition load of 48.2 psf, which is 4.9 lbs per interface inch (48.2 psf divided by 144, times 14.5 inches). The bonding strength was then decreased by cutting back the bonding area until reaching about 225 lbs when the bonding strength became insufficient to support the 48.2 psf load. At the 225 lb bonding strength, the bond to load factor was 46 (225 lbs divided by 4.9 lbs per inch). When the 22.5 inch panel was tested, it supported 11.9 psf, or 1.86 lbs per interface inch (11.9 psf divided by 144, times 22.5 inches), which was less than a fully fixed boundary condition of 12.8 psf. The 22.5 inch panel had a bond to load factor of 129 (240 lbs divided by 1.86 lbs per inch), which is 2.8 times the 46 bond to load factor for the 14.5 inch span.

In one embodiment of this inventive subject matter a fixed boundary condition is combined with a continuous condition to induce an increase in load capacity on a frame supported panel. FIG. 1 shows a panel 1 comprised of polyurethane foam 7 bonded to a cladding 23 to create a polyurethane foam composite panel 1 that is also bonded to the top edge 26 of frame members 3. The panel 1 is continuous over two or more spans 6 and, as a continuous panel, the entire panel 1 consists of a continuous section 18 that is above the top edges 26 and outside the space 4 formed between the frame member's sides 25. Assuming the polyurethane foam 7 is fixed to the top edge 26 of the frame members 3, a fixed boundary condition is induced on both the polyurethane foam 7 and the composite panel 1. The fixed boundary condition induces an increased load capacity that enables the panel 1 to support a greater load 11 than possible by the continuous condition. Load 11 is shown in the drawings by a downward pointing arrow . FIG. 1 also shows the panel 1 and frame members 3 comprise a structural section 10 with a thickness 5. A rotational resistance member 34 is shown fastened 2 to the frame member's bottom edge 27 to enable the panel 1 to carry the increased load capacity. While the foam 7 in FIG. 1 is a self-bonding polyurethane foam, it may be any type of foam that is sufficiently bonded in any manner to the cladding 23 and is thereby fixed to the frame members 3.

Combining the fixed boundary condition with the continuous condition is herein called a fixed/continuous condition. Testing was conducted on several fixed/continuous conditioned panels to determine how the combined conditions affect load capacity as compared to a simply supported and a continuous conditioned panel. The first test was of one inch thick by 3.75 inch wide by 17.5 inch long polyurethane foam panels with a 79 lbs-in$^2$ flexural stiffness and supported by 2×4 frame members and rotational resistance members. When simply supported over a 14.5 inch span, the panel supported 1.2 psf load before deflecting 0.06 inch (L/240). This was consistent with the calculated load for a 950 psi modulus of elasticity polyurethane foam. When the same panel was bonded to the top of the frame members using the same polyurethane foam with a bonding capacity of 30 psi, the panel supported 6.9 psf over the single 14.5 inch span before deflecting 0.06 inch. Therefore, the fixed panel carried 5.7 psf more or a 475% increase over what the simply supported panel could support. This was unexpected in that it is more than a 400% fixed boundary increase and because typical two pound polyurethane foam was found to produce a sufficient bonding strength to induce a fully fixed boundary condition on itself.

Similar testing was performed on an XPS foam board and a plywood panel. A 0.75 inch thick by 8 inch wide XPS foam board with a 77 lbs-in$^2$ flexural stiffness and spanning 24 inches. The foam board carried 0.25 psf when simply supported and 2.2 psf when bonded to the 1.5 inch top edge of frame members with two pound polyurethane foam that has a 30 psi bonding capacity. Therefore a 45 lbs per lineal inch bonding strength produced a 780% increased load capacity over the simply supported panel, far more than a 400% increase theoretically possible from a fully fixed boundary condition. The plywood panel was a 0.344 inch thick by 8 inch wide by 24 inch long panel with a flexural stiffness of about 5,766 lbs-in$^2$ and was tested over a 24 inch span. When simply supported the plywood carried 25.6 psf. The panel was then bonded with an eight pound polyurethane foam have a 120 psi bonding capacity, to a 3.5 inch frame member top edge for a bonding strength of 420 lbs per lineal inch (120 psi bonding capacity times 3.5 inches), the panel carried a 48.7 psf load over the same span which was a 90% increase over the simply supported load.

From the above, increasing the load capacity of the XPS foam board was much easier than for the plywood. While the XPS foam board needed only 45 psi bonding strength to induce a 780% increase in load capacity, the plywood needed 420 psi bonding strength to induce only a 90% increased load capacity. From this it is evident that the higher a panel's flexural stiffness, the greater the necessary bonding strength to induce a fixed boundary condition on the panel. However, all of the various foams, plastic and wood panels were able to show substantial increases in load capacity over different spans when induced with a fixed/continuous condition.

Testing was conducted for several continuous panels with uniformly distributed loads over two equal spans. The first test was of a one inch thick by 3.75 inch wide by 35 inch long polyurethane foam panel in a continuous condition over three 2×4 spaced apart frame members creating two 14.5 inch spans. This panel supported 2.9 psf over each span before deflecting 0.06 inch, which is 141% of the increase over the simply supported load. When bonded with two pound polyurethane foam to the top of the three frame members the fixed/continuous panel supported 9.8 psf which is a 238% increase over the 2.9 psf continuous panel's capacity. When bonded with an eight pound polyurethane foam the panel supported the same load as the two pound foam indicating that the two pound foam's bond was sufficient to induce a fully fixed boundary condition on the panel and any additional bonding strength was of no benefit. Finally, a narrow, intermittent strip of two pound polyurethane foam was used to bond the continuous panel to the frame members and the panel was only able to support 2.9 psf over the spans, the same as the unbonded continuous panel.

From the above tests, the one inch fixed/continuous panel's 9.8 psf load capacity was a 717% increase over the same one inch simply supported panel's 1.2 psf load capacity over the same span. This means that a fixed/continuous conditioned panel can have a higher load capacity increase than either a continuous panel with a maximum of a 141% increase, or a fixed boundary conditioned panel with a maximum load capacity increase of 400%, or both combined at a 540% increase. This was an unexpected result, and even more so since it was attained with a two pound density polyurethane foam bonding itself to frame members.

Figure 2:
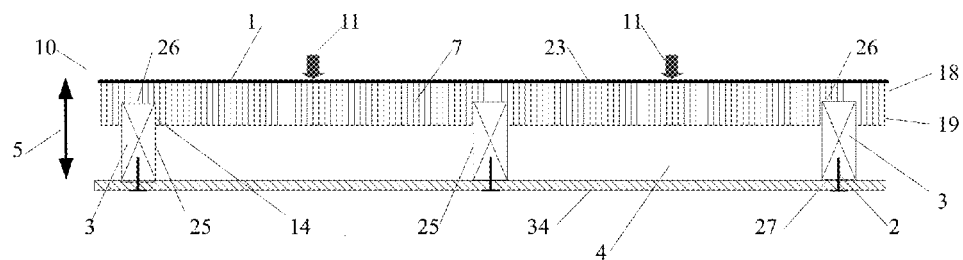
FIG. 2 is a frame supported continuous/dropped panel over multiple spans.

In another embodiment a panel's continuous section is configured with a dropped section over the span to induce an increased load capacity on the panel. This new configuration is called a continuous/dropped condition and induces a substantial increase in the panel's load capacity without increasing the structural section's thickness and/or enables a thinner section without sacrificing load capacity. FIG. 2 shows the same panel as FIG. 1 except the polyurethane foam 7 has been thickened between the frame members 3 to add a dropped section 19 that is in the space 4 between the frame member's sides 25. As such, the polyurethane foam composite panel 1 comprised of a cladding 23 and the foam 7 is both continuous over, as a continuous section 18, and dropped between the frame members 3, as a dropped section 19, to form a continuous/dropped panel condition. This results in a thickened polyurethane foam 7 while the thickness 5 of the structural section 10 remains the same. In addition, the polyurethane foam 7 has a much larger bonding area 14 by the interface with the frame member's top edge 26 and sides 25. The dropped section can be any thickness, i.e. depth, and preferably of at least 0.10 inch thick, more preferably at least 0.25 inch thick, even more preferably at least 0.50 inch thick, even still more preferably at least 0.75 inch thick and still even more preferably at least 1 inch thick. The dropped section's maximum thickness is 17.98 inches which is the panel's maximum thickness of 18 inches less the 0.02 inch minimum continuous section thickness.

Assuming a sufficient bond between the panel 1 and frame members 3, the panel 1 in FIG. 2 is herein referred to as having a fixed/continuous/dropped condition which combines the continuous/dropped configuration with a fixed boundary condition on the panel 1. The panel 1 may be fixed to the top edge 26 and/or one or more sides 25 of the frame members 3 to induce a fixed/continuous/dropped condition. Such a condition induces a substantial increase in load capacity on the panel, enabling it to carry a greater load 11, and thereby the need for rotational resistance members 34 fastened 2 or otherwise attached to the frame member's bottom edge 27. While the continuous/dropped configuration exists with or without the frame members in place, the fixed/continuous/dropped condition is only induced on the panel when the frame members are fixed in place and influence the load carrying capacity of the panel. If the panel 1 in FIG. 2 was not fixed to the frame members 3, it would have a continuous/dropped condition.

In one test of a single spanned panel with a fixed/continuous/dropped condition, a 16 inch wide foam composite panel comprised of 1.9 inch thick polyurethane foam with a 0.03 inch plastic cover (cladding). The panel's continuous section comprised of one inch foam with the plastic cover and fixed to the top edges of two frame members spaced 14.5 inches apart. The panel's dropped section comprised 0.9 inch of foam which was fixed to the sides of the two frame members facing each other. The one inch continuous section was predicted to carry 1.2 psf when simply supported and a 1.9 inch thickened panel was predicted to carry 8.2 psf simply supported and 41 psf as a fully fixed boundary panel. However, when the 1.9 inch thick fixed/continuous/dropped panel was load tested it carried a 113 psf load, a 176% increase over the 41 psf predicted fully fixed boundary condition, a 1,278% increase over the 8.2 psf thickened panel and a 9,317% increase over the 1.2 psf continuous section.

Testing was also conducted on several 4.5 inch thick structural sections comprised of a one inch polyurethane foam panel over the top of 1.5 inch wide by 3.5 inch deep frame members for both single and multiple spans. One set of panels were simply supported or continuous panels comprised of a one inch thick section of foam supported by and/or continuous over the top edge of frame members. A second set of panels were continuous/dropped panels that had a one inch continuous section over the frame members and a one inch dropped section that thickened the panel to two inches between the frame members. The spans were all 14.5 inches and the frame members were supported by rotational resistance members to prevent frame member rotation.

The first test was of a 3.75 inch wide by 17.5 inch long, one inch thick simply supported panel over a single 14.5 inch span that carried 1.2 psf before deflecting 0.06 inch. A second test was of a 17.5 inch long simply supported continuous/dropped panel over a 14.5 inch span with a one inch continuous section and a one inch dropped section. This panel carried 7.4 psf or a 517% increase in load capacity over the one inch simply supported panel. In another test, the one inch thick×17.5 inch long panel was bonded to the top edges of the frame members with two pound polyurethane foam to induce a fixed/continuous condition on the panel. This panel carried 6.9 psf, about a 475% increase from its 1.2 psf simply supported. The continuous/dropped panel was then fixed to both the top edge and the sides of the frame members facing each other to induce a fixed/continuous/dropped condition on the panel which supported 33.1 psf. As such, the fixed/continuous/dropped conditioned panel over a single span produced an increased load capacity of 2,658% over the 1.2 psf carried by the same simply supported panel and a 380% increase over the 6.9 psf supported by the same panel in a fixed/continuous condition. The 33.1 psf was also a 347% increase over the 7.4 psf continuous/dropped panel and was 248% above the predicted load of 9.5 psf for a simply supported 2" thickened section.

The same panels were then lengthened (spliced) with the same polyurethane foam to 35 inch long and positioned to be continuous over two equal 14.5 inch spans. In these tests, the one inch thick, unbonded continuous panel carried 2.9 psf, which was a 141% increase over the single span, as predicted. When the continuous panel was bonded to the top edges of the frame members with two pound foam to induce a fixed/continuous condition on the panel, it was tested to carry 9.8 psf. Testing of the same lengthened continuous/dropped panel resulted in it carrying 17.5 psf with the dropped section tightly against the frame member's sides and 11.9 psf when a 0.12 inch gap existed between the dropped section and the frame member's sides. When the continuous/dropped panel was fixed to the top edge and sides of the frame members with a two pound foam to induce a fixed/continuous/dropped condition on the panel, it was able to support 36.5 psf over each span. As such, the fixed/continuous/dropped conditioned panel over two spans produced an increased load capacity of 1158% over the continuous panel's 2.9 psf and 272% above the 9.8 psf supported by the fixed/continuous panel. The 36.5 psf was also a 207% increase over the 11.9 psf of the continuous/dropped panel with the gap, indicating less than a fully fixed boundary condition. The 36.5 psf capacity was also 60% above the predicted load capacity of 22.8 psf for a simply supported two inch thickened section over two spans.

The dramatic increases in load capacity induced on a panel by the fixed/continuous/dropped condition were unexpected because they are far above the 141% increases from a continuous condition, or the 400% increase from a fixed boundary condition or even the 272% increase over the fixed/continuous conditioned panel. The fixed/continuous/dropped conditioned panels also had significant increased load capacities over the fixed/continuous panel, the continuous/dropped panel and even over the continuous panel having its continuous section the same thickness of a continuous/dropped panel's thickened section. Not only does the dropped section increase the panel's load capacity, it also increases the interface which enables more bonding area to further increase the fixed boundary condition.

A 0.344 inch thick plywood panel was also tested with the fixed/continuous dropped condition over a 48 inch span. When simply supported the eight inch wide panel carried 2.4 psf and when bonded to frame members with a 180 lbs per lineal inch bonding strength it carried 7.1 psf. This was a 200% increase for a fixed/continuous condition. When a one inch layer of polyurethane foam was bonded to the plywood as a dropped section, the fixed/continuous/dropped conditioned panel carried 8.4 psf over the 48 inch span, a 250% increase in load capacity over the continuous section's 2.4 psf.

As a result of this and other testing all of the low modulus of elasticity materials or panels having a low flexural stiffness had an increased load capacity induced on the panel with a fixed/continuous/dropped condition. This applied to all foams, plastic, wood and other materials.

As demonstrated above, a panel's load capacities from the various existing and new conditions can be compared to one another. While the existing simply supported, continuous and fixed boundary conditions all have mathematical relationships, the new conditions must be load tested until more definitive relationships are determined. Since the fixed boundary condition is variable, based upon bond strength, it is more meaningful to compare the increased load capacities induced on panels by the new conditions with the load capacities of simply supported or continuous conditioned panels.

A panel configured with a dropped section has a different flexural stiffness for the part of the panel that is over frame members and for part of the panel that is the thickened section over the span. Since the dropped section may or may not be bonded to the continuous section, a panel with a dropped section may have a different flexural stiffness for the continuous section, the dropped section and for the combined continuous and dropped sections, i.e. the thickened section. Additionally, a panel's load capacity over a span may also be separately determined for the continuous section only, the dropped section only or for the thickened section. This applies regardless of whether the panel is simply supported or continuous and whether or not the continuous and dropped sections are bonded together. Fillets are not included in determining flexural stiffness.

As such, a simply supported and a continuous conditioned panel both have a continuous section that has a load capacity over only one or over each of several individual spans. This enables the increased load capacity of panels induced with the continuous/dropped condition or the fixed/continuous/dropped condition to be compared to the same panel's preconditioned continuous section. This comparison determines the amount of increased load capacity provided by inducing the new conditions on the panel. The increased load capacity induced over a panel's spans by the new conditions may be induced over the outside spans or over one or more spans, or preferably over two or more spans or more preferably over three or more spans or even more preferably over at least half of the spans and still more preferably over substantially all of the spans or even more preferably still over all of the panel's spans. The increased load capacity induced by a fixed/continuous/dropped condition may also be compared to the load capacity of the panel's unfixed thickened section.

When comparing an installed panel's load capacity, a virtually identical panel may be fabricated and load tested instead of the installed panel as long as the materials and dimensions are sufficiently identical to result in a fair load capacity comparison.

Figure 3:
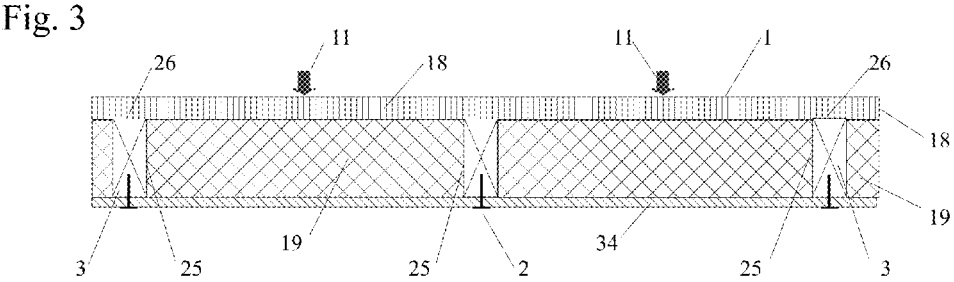
FIG. 3 is a continuous/dropped panel supported by a rotational resistance member.

In another embodiment a panel with the continuous/dropped condition can derive some or all of its increase in load capacity from rotational resistance members. For example, a continuous/dropped conditioned panel 1 is shown in FIG. 3 comprised of a continuous section 18 continuous over the frame member's top edge 26 and a dropped section 19 between the frame member's sides 25 and in contact with the continuous section 18. The continuous section 18 and the dropped section 19 may be of the same or different material and may or may not be bonded to one another. Also shown is a rotational resistance member 34 that is fastened 2 or otherwise bonded to the frame members 3 and in contact with the dropped section 19. As a result of this configuration the panel 1 has a continuous/dropped condition that increases the load 11 it can carry by virtue of the support, i.e. bearing capacity, provided by the rotational resistance member 34 to the dropped section 19. The amount of increase in load capacity can be wholly or partially dependent upon the load capacity of the rotational resistance members 34. As an alternative, the continuous section 18 and/or the dropped section 19 of FIG. 3 may be fixed to the frame members 3 to induce at fixed/continuous/dropped condition on the panel 1.

Figure 4:
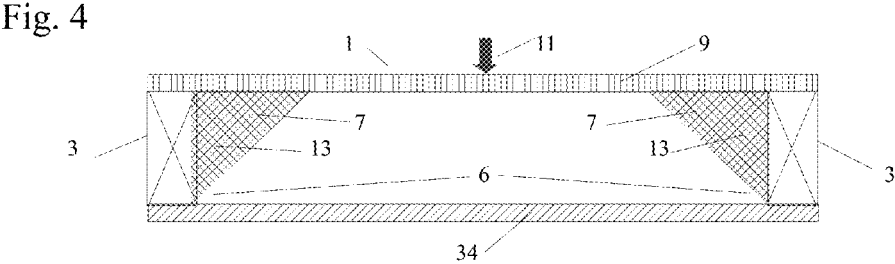
FIG. 4 is a simply supported panel over a single span with a shortened span.

Another embodiment is based upon the discovery that the panel's dropped section may be shaped to further or more efficiently increase the panel's load capacity. For example, FIG. 4 shows an XPS foam board 9, tested as a panel 1 supported by two frame members 3 spaced 24 inches apart and load tested to carry 0.25 psf before deflecting 0.10 inch (L/240). However, when a buildup 13 of polyurethane foam 7 was bonded to each frame member 3 and the foam board 9, the same XPS foam board 9 carried a 4.5 psf load 11 over the 24 inch span 6. This is a 1,700% increase in load capacity above the 0.25 psf simply supported load and required a rotational resistance member 34. A similar test was done with 0.344 inch plywood and the same buildups. In that test simply supported plywood over an 18 inch span supported 40 psf and when 3.5 inch fillets were added as a fixed dropped section, the fixed/continuous/dropped plywood panel supported 147 psf over the same span, a 267% increased load capacity.

Such a substantial load capacity increase was caused by two factors. First, the polyurethane foam provided a sufficient bond to induce a fixed boundary condition that increased the foam board's load capacity. Second, the buildup was of a sufficiently strong material to function like a ledge attached to the frame member that effectively shortened the span between frame members. This is validated by the beam theory formulas where the calculated load for a fully fixed boundary condition for this XPS foam board over a 15.8 inch span is 4.5 psf, the same as obtained from the tested panel. Although, while the polyurethane foam fillets maximized shortening the span and inducing a fully fixed boundary condition on the XPS foam board, the same fillets were less effective on the 0.344 inch thick plywood in that a fully fixed boundary condition over an 11 inch span should have carried a 180 psf load.

Figure 5:
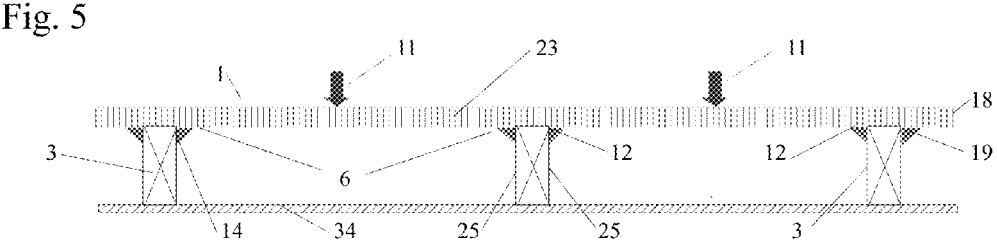
FIG. 5 is a frame supported fixed/continuous/dropped panel with fillets.

The buildups 13 of FIG. 4 are basically large fillets that can be placed on one or both sides of the frame members. FIG. 5 shows a continuous panel 1 comprised of a cladding 23 with fillets 12 bonded to the bottom of the cladding 23 to create a fixed/continuous/dropped panel. The fillets 12 are also bonded to both sides 25 of the frame members 3 to effectively shorten the span 6 between frame members 3 and thereby increase the panel's 1 load 11 capacity even more. In addition, when fillets 12 are bonded to both the panel 1 and the side 25 of the frame members, they increase the bonding area 14 which increases the bonding strength and thereby induces a greater fixed boundary condition to further increases the panel's load capacity.

As such, both a simply supported and a continuous panel can be converted into a fixed/continuous/dropped conditioned panel by the addition of fillets 12 bonded to the sides 25 of frame members and optionally bonded to the bottom of the simply supported or continuous panel 1. When this occurs, the panel 1 is then comprised of a continuous section 18 and a dropped section 19 with the dropped section consisting of fillets 12. A rotational resistance member 34 will be required to prevent frame member 3 rotation from the increased load 11. Therefore, a panel may have a single dropped section, when over a single span, or multiple dropped sections when a panel is continuous over several spans and/or multiple dropped sections such as two fillets within each span or the continuous section having a corrugated shaped bottom that extends into the dropped section area. As a result, a panel may have one or more dropped sections between said frame members.

Figure 6:
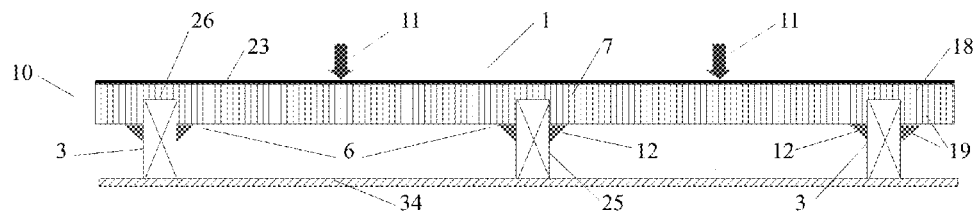
FIG. 6 is a fixed/continuous/dropped panel with a thickened section and fillets.

Fillets are herein defined as a distinguishable strip or intermittent strips of any material capable of bonding to the sides of frame members in order to support a continuous panel. Distinguishable means the fillet can be distinguished from the frame member. For example welds are considered to be distinguishable whereas molded or integral cast fillets on a frame member are not. Fillets may have a self bonding or self-adhesive capability such as polyurethane foam or otherwise adhered to frame members and optionally adhered to the panels. When not adhered to the panels the fillets can effectively shorten the span between frame members. As such, in order to support a continuous panel, fillets must be of such material or composition, i.e. material appropriate, capable of effectively shortening the span and optionally of sufficiently bonding the panel to the frame members to induce a fixed boundary condition on the panel. Since the fillets are bonded to the sides of frame members, they are considered a dropped section in and of themselves as shown in FIG. 4 or they may extend the dropped section as shown in FIG. 6. In foam backed panels fillets may be bonded to the continuous section's foam and thereby add a dropped section, or bonded to the dropped section's foam and thereby extend the dropped section, or they may be unbonded to the continuous section and simply provide a support structure on which the continuous section bears.

Since fillets are included as a panel's dropped section and used to increase the load capacity of the panel's continuous section, a continuous section may span as much as 100 inches and still have its continuous section's load capacity increased by 100% or more by adding fillets. For example, a 6 inch polyurethane foam board with a 1,200 psi modulus of elasticity can carry one psf over a 100 inch span with a 0.417 inch deflection as simply supported. Bonding the panel to frame members and adding eight inch fillets to both ends effectively shortens the span to 84 inches and enables the panel to carry two psf, a 100% increase in load capacity. Or, if 12 inch fillets are used, the span is effectively shortened to 74 inches and the panel can carry three psf with the same 0.417 inch deflection, which is a 200% increase in load capacity above that of the continuous section. In both cases the panel is 18 inches or less thick, which is the maximum panel thickness.

FIG. 6 shows a structural section 10 having a fixed/continuous/dropped panel configuration with a continuous section 18 over the top edge 26 and comprised of a cladding 23 bonded to foam 7. The panel's dropped section 19 is comprised of foam 7 extending from the continuous section 18. The foam 7 is fixed to the frame members 3 and thereby a fixed/continuous/dropped condition is induced on the panel 1. Fillets 12 extend the dropped section 19 along the sides 25 of the frame members 3. The fillets 12 increase the panel to frame interface and bonding area 14 and effectively shorten the span 6, both of which further increase the panel's load 11 capacity. The structural section 10 is comprised of the panel 1, frame members 3 and the rotational resistance member 34.

A test comparing a two inch thick continuous panel with a fixed/continuous/dropped panel having a two inch thickened section was conducted. The predicted load capacity for a two inch thick polyurethane foam panel over 14.5 inch spans is 9.4 psf when simply supported, 35.7 psf for a continuous conditioned inside span (3.8 times 9.4) and 47 psf for a fixed boundary condition (5 times 9.4). These predicted loads were compared to the actual loads carried by the inside span of a continuous/dropped and a fixed/continuous/dropped panel with a two inch thickened section comprised of a one inch thick continuous section and a one inch thick dropped section of polyurethane foam. When tested, the continuous/dropped panel carried 42.4 psf on it's inside span, which is more than the 35.7 psf for the two inch thick continuous panel over the same span. However, the fixed/continuous/dropped panel's inside span was able to support 75.5 psf, a 34% increase over the two inch thick continuous panel. This demonstrates that both inside spans can be increased by the new conditions and that sufficiently bonding, i.e. fixing a continuous/dropped panel substantially increases its load bearing capacity.

A panel is defined as a generally rigid surface, having some amount of flexural stiffness, such as a sheathing that covers a frame or frame members. The panels of this invention may be exterior panels, interior panels or both. The panel's outside surface, i.e. its face, may be flat or shaped and the inside surface, i.e. its backside, may have protrusions or indentations. A panel may be of any material or combination of materials not herein excluded and be of any size. Some examples of panels are: plywood or plastic sheets, sandwich panels, wood or foam boards, siding and roof panels, rib and similar protrusion backed panels, claddings, molded and corrugated or any combination hereof to name a few. A panel may be a composite panel, which is defined as a panel comprised of two or more materials adhesively bonded together. A foam panel has foam as its sole material and a foam backed panel is comprised of a material with foam backing.

Due to the interrelationship of compressive and tensile strength in a panel's rotation, it is important that a panel's compressive and tensile strengths be relatively similar for purposes of this disclosure. Therefore any panel comprised of 50% or more in volume of a material that has a five times or greater difference between its compressive and tensile strength, both as measured perpendicular to the face or grain, is specifically excluded as a panel. Some of the excluded materials include concrete, ceramics and glass, all with about ten times more compressive strength than tensile strength. Other materials such as glass fiber epoxy composites, tend to have higher tensile strengths than compressive strengths. It should be noted that thin claddings made of concrete, ceramics and glass may be combined with another material such as foam to create a composite panel. In these cases the concrete, ceramics, glass and glass fiber resins, etc., must comprise less than 50% of the panel's volume to be covered by this invention.

One objective of the inventive subject matter is to increase the load capacity of weaker, lighter and thinner panels which are panels comprised of materials having a low modulus of elasticity or panels with a continuous section having a low flexural stiffness. As herein disclosed in several examples, panels comprised of low modulus of elasticity materials such as foam, can have significant increases in load capacity when induced with one the new conditions. Panels with a continuous section having a low flexural stiffness, may be comprised of almost any material, although materials having a high modulus of elasticity, such as wood or metals which are generally flat, need to be much thinner to have a low flexural stiffness. For panels that have a flat continuous section a low flexural stiffness of the continuous section is herein defined as less than 20,000 lbs-in$^2$, preferably less than 10,000 lbs-in$^2$, more preferably less than 8,000 lbs-in$^2$, even more preferably less than 4,000 lbs-in$^2$ and still even more preferably less than 2,500 lbs-in$^2$. Examples of flexural stiffness for wood having a 1,700,000 modulus of elasticity are about: 0.52 inch thick has a flexural stiffness of 20,000 lbs-in$^2$; 0.41 inch thick has a 10,000 lbs-in$^2$; 0.38 inch thick an 8,000 lbs-in$^2$; 0.30 inch thick a 4,000 lbs-in$^2$ and 0.26 inch thick a 2,500 lbs-in$^2$ flexural stiffness. The thinner the flat wood or other material becomes, the greater the influence that a low modulus of elasticity material bonded to the wood, as a dropped section, will have on increasing the resulting composite panel's load capacity. All other continuous section shapes other than flat, may have unlimited flexural stiffness, although the higher the continuous section's flexural stiffness, the more difficult it is to increase the panel's load capacity with a dropped section and/or a fixed boundary condition.

Flat panels are defined as those whose moment of inertia can be determined by the formula $I=bh^3/12$ where I=moment of inertia, b=base and h=height, and with or without composite material transformation. As such, flat panels have two generally flat, parallel faces with no exposed or embedded protrusions. For example, sheets of plywood, foam boards, slabs, boards, metal plates, rib-less sandwich panels are flat panels. Ribbed panels are defined as a panel comprised of a skin or cladding with protrusions such as ribs extending at an angle from the skin, regardless of whether the protrusions are molded or otherwise bonded to the skin or are bent, corrugated or otherwise shaped from the skin and results in panel with an increased moment of inertia resulting from such non-flat shape.

Generally, increasing load capacity for wood panels by 25% or more begins to be difficult at about 0.35 inch thick. For example a 0.344 inch thick plywood panel eight inches wide over a 24 inch span can carry about 19.3 psf before deflection 0.10 inch. In order to induce a fixed/continuous condition or a fixed/continuous/dropped condition on the panel that increases it's load capacity by 25%, testing has shown that about 30 lbs of bonding strength is necessary. This may be obtained with a one inch thick dropped section of two pound polyurethane foam, although this low modulus of elasticity dropped section does nothing except provide a 30 lb bonding strength to bond the panel to the frame members. A thinner dropped section or a lower bonding strength may not reach the 25% increase. At 0.44 inch thick a wood panel can carry about twice the load as a 0.34" panel and thereby requires substantially greater bonding strength that makes it unreasonable to use as a panel.

In order to demonstrate that the new conditions clearly provide an increased load capacity over a simply supported, a continuous panel, a continuous section or over a thickened section is for the increase to be large enough to be easily distinguished. As such, a panel with one of the four new conditions must have an increased load capacity at least 10% greater, preferably 25% greater, more preferably 50% greater, even more preferably 100% greater, still more preferably 200% greater, even still more preferably 300% greater and even more preferably still 400% greater than, i.e. above, the simply supported, continuous panel, continuous section or thickened section to which the increase load capacity is compared. This means that a panel's increased load capacity of at least 25% greater than the panel's continuous section's load capacity must result in an increased load capacity of at least 125% of the continuous section's load capacity. For example if a panel's continuous section has a 60 psf load capacity, a load capacity of at least 25% greater is at least 75 psf. The amount of increased load capacity may be predetermined.

Given the wide variety of materials and applications for which this inventive matter can be used, some experimentation will be necessary. However, since the objective of this inventive matter is to only increase as opposed to maximize a panel's load bearing capacity, there is no need for undue experimentation. Given this inventive matter and the availability of material properties such as bonding capacity and modulus of elasticity as well as the existence of flexural stiffness and deflection formulas, some indication of the degree of increased load capacity can be easily estimated with experimentation to confirm it. It will be recognized by those skilled in the art that as a continuous section's flexural stiffness increases or the span increases, the percentage increase in a panel's load capacity created by the new conditions will decrease, until at some point the new condition's increase in load capacity fails to reach its minimum required increase and is thereby ineffective.

The following example demonstrates how the maximum increased load capacity of a fixed/continuous/dropped conditioned panel may be determined and the magnitude of the increase over the panel's continuous section. Beginning with a panel's continuous section comprised of a 0.5 inch thick EPS foam board having a 120 psi modulus of elasticity resulting in a 1.25 lbs-in$^2$ flexural stiffness. When simply supported over a uniformly loaded single 14.5 inch span this panel can support about 0.019 psf. When continuous over two 14.5 inch spans, as a continuous section, it can support about 0.044 psf before deflecting more than 0.06 inch (L/240).

The EPS panel is induced with a fixed/continuous/dropped condition by bonding it to the top of frame members and bonding a two inch thick polyurethane foam dropped section, with a 1,000 psi modulus of elasticity, to it's backside. The dropped section is also bonded to frame member's sides to enable the fixed/continuous/dropped panel to carry about 50 psf over each 14.5 inch span. Adding two inch fillets effectively reduces the span to 10.5 inches and thereby the panel can support about 183 psf before deflecting more than 0.06 inch. This 183 psf load equals 1.27 psi, which over a 14.5 inch span equals 18.4 lbs of load per inch of the panel to frame member interface.

Testing has shown that a two inch thick polyurethane foam panel over 14.5 inch span has about a 46 bond to load factor to induce a fully fixed boundary condition on the foam panel. Adding a 2.5 safety factor increases this to a 115 bond to load factor and multiplying it times 18.4 lbs=2,116 lbs. Since the two inch thick dropped section plus the two inch fillets provide 4 square inches of bonding area per interface inch, a bonding material with a 529 psi bonding capacity is needed to support the 2,116 lbs per interface inch. Presently, bonding materials with higher bond capacities applicable to polyurethane foam ranges up to about a 1,000 psi bonding capacity with a 75 lb density polyurethane foam. Any material appropriate bonding material having a 529 psi or greater may be used to bond the panel to the frame members. As such, the 183 psf increased load capacity induced on the panel by the fixed/continuous/dropped condition is a 415,909% increase over the continuous section's 0.044 psf load capacity.

However, in the event a bonding material with a bonding capacity of only 480 psi is preferred, it is possible to work backwards from the selection of bonding capacity. For example, a material with a 480 psi bonding capacity applied to the 4 square inch interface has a 1,920 lb bonding strength and when divided by the 115 bond to load factor results in a 16.7 lb interface load. Dividing this by the 14.5 inch span and multiplying it by 144 equals a 166 psf load, which is the maximum load possible for this bonding capacity under these conditions and results in the fixed/continuous/dropped panel having a 377,272% increased load capacity over the 0.044 psf load capacity of the panel's continuous section.

A frame member is any structure that supports at least part of a panel over a span and has at least a top edge, a bottom edge and two sides. The top edge is the frame member side to which a panel attaches and the bottom edge and sides may be herein referred to an non-top edges. Frame members may be of any type, material, size or shape and used for any application and the top or bottom edges may be a tip or an apex. There may also be a multitude of edges such as a channel and a multitude of sides such as a circle or polygon. Frame members include any frame member used in any type of structure including all building frame members such as studs, rafters, purlins, battens, beams, columns, plates, ledger boards and similar members. Frame members include attachments or extensions such as flanges, mountings and supports and may also include cladding extensions that are molded, bent or otherwise shaped into ribs, perimeter returns or other rib-like configurations generally perpendicular to the cladding and that functions like a frame member. Frame members also include ribs when the ribs are acting as frame members in a configuration that induces a fixed/continuous and/or a continuous/dropped condition on a foam composite panel.

Figure 7:
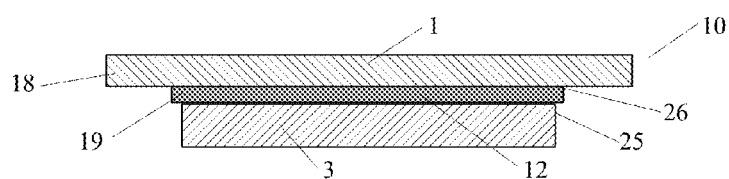
FIG. 7 is a section view of a circular fixed/continuous/dropped panel supported by a single frame member and with fillets as the dropped section.
Figure 8:
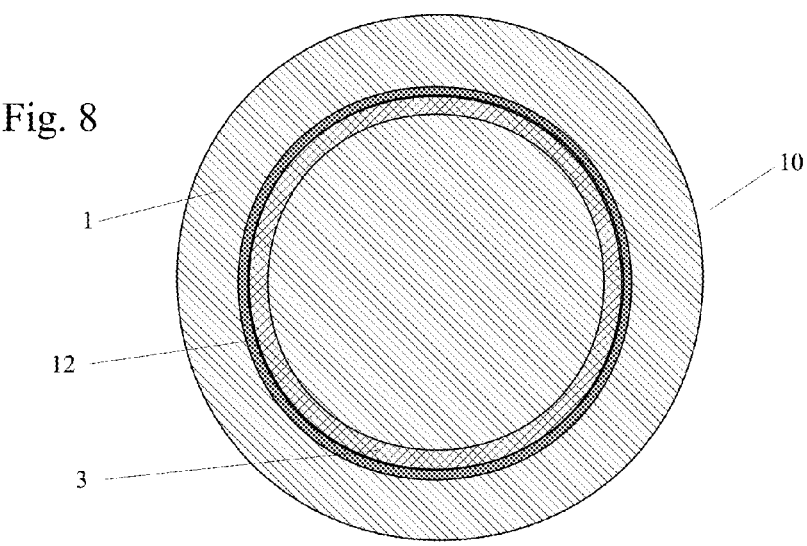
FIG. 8 is a bottom view of FIG. 7 showing the circular panel and the single, circular frame member.

A frame or framework is comprised of a single or a multitude of spaced apart frame members, attached or unattached to one another. A single or a multitude of frame members shall mean that either a single frame member by itself or optionally any number of more than one frame members may be used to support a panel. A single frame member may be spaced apart from itself such as a circular shaped frame member as shown in FIGS. 7 and 8. FIG. 7 is a section view of a structural section 10 comprised of a panel 1 supported by a single frame member 3. The panel 1 is comprised of a continuous section 18, that is over the top edge 26 of the single frame member 3, and a dropped section 19 which is a fillet 12 bonded to the panel 1 and to the sides 25 of the single frame member 3. FIG. 8 is a bottom view of FIG. 7 showing structural section 10 with a circular panel 1 continuous over a single, spaced apart frame member 3 with the fillet 12 bonded to both the frame member 3 and the panel 1 to induce a fixed/continuous/dropped condition on the panel 1. Since the panel 1 is continuous over and extends beyond the outside perimeter of the frame member 3 any load on the span will be resisted by the cantilever and the panel has a continuous condition. Rotational resistance is provided by the curvature of the frame member 3 which prevents it from rotating.

As such, in another embodiment of the inventive subject matter, FIGS. 7 and 8 shows that a panel may be continuous over and supported by, i.e. bears on, one spaced apart frame member that creates a single span and is in a continuous condition that has an increased load capacity over that span. When this embodiment is combined with the continuous conditioned panels over two or more spans it may be said that a panel may be continuous over and supported by one or more spaced apart frame members to create one or more spans between said frame members and the panel has a load capacity over the spans.

In another embodiment a ribbed panel, comprised of a skin or cladding backed by ribs may be a frame supported ribbed panel and/or a ribbed structural section depending upon how the panel is used. The frame supported ribbed panel is one where the ribs are supported by frame members, whereas the ribbed structural section is one where the ribs are frame members. As such, a panel, used as a ribbed structural section, is defined as excluding the ribs while a panel, used as a frame supported ribbed panel, is defined as including the ribs. For purposes of this disclosure all ribbed panels are limited to composite panels that have both the ribs and a second material bonded to the skin's backside and the second material is also bonded to at least some of the rib's sides. In most cases the second material is a foam and such a panel is a ribbed foam composite panel. As used herein skin and cladding are synonymous.

Figure 9:
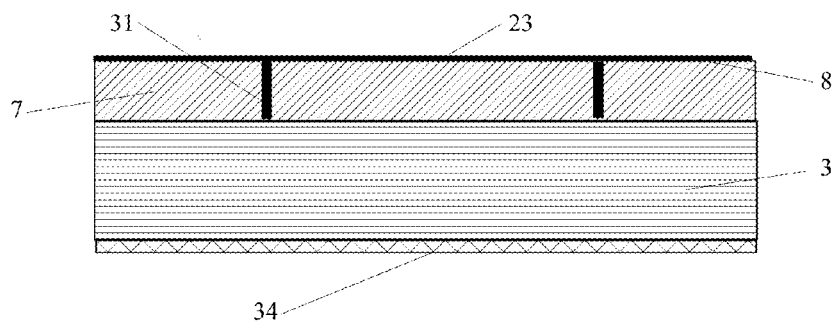
FIG. 9 is a ribbed foam composite panel bonded to the top of frame members with polyurethane foam.

Testing was undertaken to determine whether the fixed boundary condition and the continuous/fixed condition can induce an increase in load capacity on a frame supported ribbed panel since such panels have a relatively high flexural stiffness. Two six inch wide ribbed panels were tested and were comprised of a twin "T" shape with a 0.05 inch thick vinyl cladding (the skin) and two 0.05 inch wide by one inch tall ribs spaced three inches apart and 1.5 inches from each edge and perpendicular to the cladding. The vinyl had a modulus of elasticity of about 350,000 psi and the ribbed panel had a flexural stiffness of about 5,100 lbs-in$^2$. The ribbed panels were foam composite panels since the polyurethane foam was bonded to the cladding's backside and to the ribs and thereby bonding the ribs to the cladding. The first ribbed panel was a continuous panel comprised of one inch thick polyurethane foam 7 bonded to the backside 8 of a vinyl cladding 23, to the ribs 31 and also bonded to and supported by spaced apart frame members 3 as shown in FIG. 9. A rotational resistance member 34 prevented the frame members 3 from rotating. The second ribbed panel (not shown) was a fixed/continuous/dropped panel with the same continuous section as the continuous panel and a one inch thick polyurethane foam dropped section and was fixed to the frame member's top edge and sides. In both cases the ribs were bonded to the cladding with the polyurethane foam as opposed to being molded to the cladding. The polyurethane foam was two pound density foam with a modulus of elasticity of about 950 psi.

The continuous panels were tested first as simply supported over different single spans of 14.5, 22.5 and 34.5 inches respectively, with uniforms loads until deflection reached L/240. The load test results were 28 psf, 7 psf and 2.1 psf respectively, which was consistent with calculated loads with the bonded ribs performing as though they were molded to the cladding. The continuous panels were then induced with a fixed/continuous condition by being fixed to the top edges of the frame members using an eight pound density polyurethane foam having a 120 psi bonding capacity. When tested the ribbed, fixed/continuous panels all had substantial increases in load capacity and in some cases greater than a 400% increase. Moreover, adding one inch fillets to the one inch thick fixed/continuous panels further increased their load capacity. For example, over the 22.5 inch span, the continuous panel carried 7 psf, and when fixed it carried 25.6 psf, a 266% increase, and when fixed and with fillets it carried 32 psf, a 357% increase.

The fixed/continuous/dropped panels were also tested and carried 170 psf, 47 psf and 13 psf respectively over the same 14.5, 22.5 and 34.5 inch spans. As such, the fixed/continuous/dropped panels each carried over a 500% increase in load capacity above the ribbed continuous conditioned panel. In all cases the frame supported ribbed panels performed similar to rib-less panels with comparable degree of increases in load capacity for a fixed/continuous condition and a fixed/continuous/dropped condition. This demonstrates that the same percentage increase induced on a foam panel can be induced on a frame supported ribbed panel and a foam composite panel, despite the ribbed panels having a higher flexural stiffness. This finding was unexpected because the increases were easily induced on ribbed panels having a relatively high flexural stiffness and the foam was sufficient to prevent the thin ribs from buckling despite up to 170 psf loads. The 34.5 inch fixed/continuous/dropped panel was also tested over two 15.5 inch spans and found to exhibit the same increases in load capacity as the non-ribbed panels over two or more spans.

In another embodiment the ribbed panel is a ribbed structural section with a composite cladding. During testing it was discovered that ribs may function as frame members in inducing the fixed/continuous and the fixed/continuous/dropped conditions on a ribbed panel's skin. Basically the skin is continuous over and bonded to spaced apart ribs and, assuming a sufficient bond, a fixed/continuous condition is induced upon the skin. As such the ribbed panel's skin, whether or not a composite, has an increased load capacity.

As previously stated, both the frame supported ribbed panel and the ribbed structural section are limited to having a composite cladding comprised of a second material, such as foam and preferably polyurethane foam, adhesively bonded to the cladding's backside and to the sides of the ribs. Therefore, a ribbed structural section has a composite cladding with an increased load capacity induced by a fixed/continuous/dropped condition. It is important that the dropped section be distinguishable from the frame members for a fixed/continuous/dropped condition. Otherwise, the dropped section may be a thickened continuous section.

Figure 10:
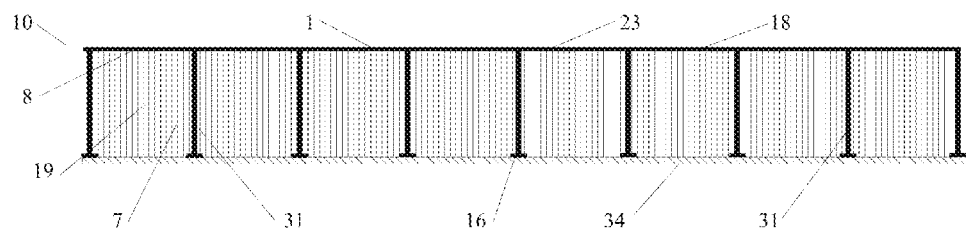
FIG. 10 is a ribbed structural section with a polyurethane foam dropped section to reinforce the ribs and the skin and induce a fixed/continuous/dropped condition on the skin.

FIG. 10 shows a ribbed structural section 10 comprised of a panel 1, ribs 31 as frame members and a rotational resistance member 34. The panel 1 is a composite panel comprised of polyurethane foam 7 (or another foam) bonded to the backside 8 of a cladding 23 and at least the cladding 23 is continuous over spaced apart ribs 31 acting as frame members. The cladding 23 is bonded to the ribs 31 and the ribs 31 may be integrally molded to the cladding 23 or the polyurethane foam 7 or other bonding material may be used to bond the ribs 31 to the cladding 23. The cladding 23 comprises the continuous section 18 and the polyurethane foam 7 comprises the dropped section 19 of the composite panel 1 and therefore a fixed/continuous/dropped condition is induced upon the composite panel 1.

This condition increases the load capacity of the cladding 23 and polyurethane foam 7 composite panel 1 over the span between the ribs 31. While the increase in the cladding's 23 load capacity occurs perpendicular to the ribs 31, the increased load capacity functions in all directions. In addition, the foam 7 bonded to the sides of the ribs 31 may stiffen the ribs 31 from buckling. Flanges 16 are also shown which increases the rib's 31 flexural stiffness. Finally, a rotational resistance member 34 is attached to the flanges 16 and may also be bonded to the polyurethane foam 7. In the event the rotational resistance member 34 provides a second face bonded to and covering substantially all of the polyurethane foam 7, the structural section becomes a sandwich panel and is not a structural section of this disclosure. The structural section 10 of this disclosure specifically excludes a sandwich panel structure which requires both skins to cover substantially all of the structure's front and back sides and the skins adhesively bonded to a core material that is different than that of the skins.

Figure 11:
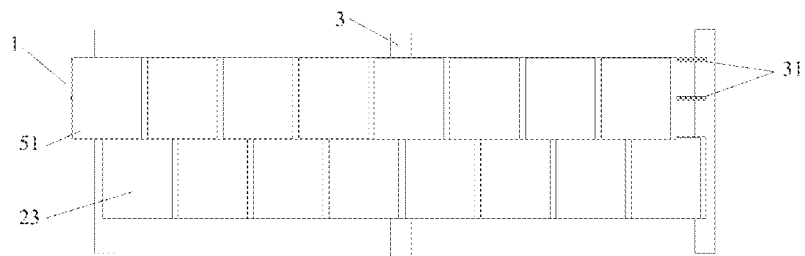
FIG. 11 is a ribbed panel with ribs bonded to the backside and partially exposed by extending from the cladding.
Figure 12:
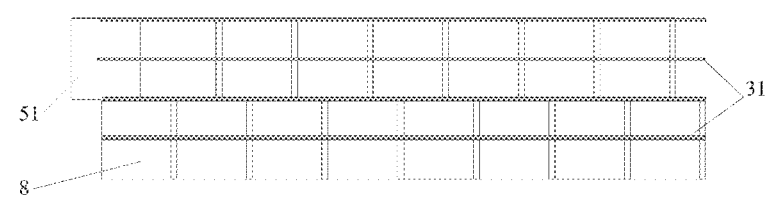
FIG. 12 is the backside of FIG. 11 showing the full length of the ribs and also showing a overlapping section of the cladding having no rib support.

FIG. 11 shows the front side of a panel 1 and of the cladding 23. The panel 1 is a frame supported ribbed panel supported by spaced apart ribs 31 bonded to the panel's backside 8 with an adhesive as shown in FIG. 12. Of particular significance are the exposed ribs 31 and the overlapping section 51. The ribs 31 that are exposed in FIG. 11 and extend beyond the cladding 23 in both FIGS. 11 and 12 are designed to support the overlapping section 51 of an adjacent panel when that panel is positioned in line. The ribs 31 extend over the top of and are supported by the three frame members 3 and in turn support the cladding 23, including the cladding's overlapping section 51. After the panels 1 are positioned, a blanket of polyurethane foam is applied on the backside 8 and the frame members 3 to bond the panels together and to the frame members. It should be noted that a thin layer of polyurethane foam may be used as an adhesive and applied to the panel's backside 8 and the ribs 31 before the panel's 1 final positioning on frame members 3 such that a panel is partially prefabricated. Such a partially prefabricated panel may comprise either a portion or all of the panel's continuous section and may or may not include all or part of a dropped section.

The application of such a thin layer of adhesive foam can be used to prefabricate panels comprised of individual cladding tiles, shingles, etc., with polyurethane foam and the ribs bonding the individual pieces together to facilitate panel handling. A second layer of polyurethane foam may also be used to fill in any voids present in the continuous section and to add the dropped section. For example if the prefabricated thin layer of polyurethane foam only filled part of the continuous section a second layer of polyurethane foam can fill in the remaining part of the continuous section after the panel has been set in it's final positioning on frame members, When the second layer of polyurethane foam is applied to the first layer the foams are spliced together resulting in structural continuity as herein disclosed.

From this it is obvious that a stiffened frame supported panel may be created by installing various parts of the panel during a structure's construction. For example frame members may be assembled into a frame and/or erected in place on a job site. A wall or roof may be built by positioning panel materials such as a cladding, sheathing or a partially prefabricated panels, in place, secured from movement, with their backside on or near and facing the frame member's top edges. While these materials will become part of the completed panel's continuous section they do not have to be continuous over the frame member's top edges if they are at some point attached to another continuous section material that is continuous over the top edges (see the bricks in FIG. 16). To complete and stiffen the panel one or more layers of polyurethane foam are applied to the material's backside and the foam expands to fill in the continuous section and make it continuous over the frame member's top edges, bonds the panel to the frame members, induces a fixed boundary condition on the panel and creates a dropped section.

Figure 13:
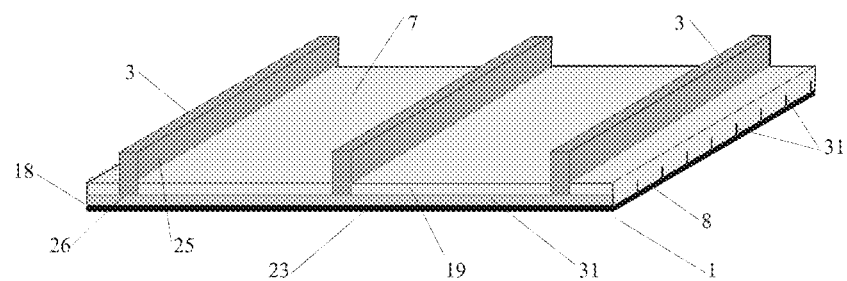
FIG. 13 is a perspective of a ribbed foam composite panel bonded to frame members to induce a fixed/continuous/dropped condition on the composite panel.

FIG. 13 shows a perspective of the backside of a frame supported ribbed composite panel 1 in a fixed/continuous/dropped condition. The composite ribbed panel 1 is comprised of a cladding 23 with spaced apart ribs 31 molded or otherwise bonded to the cladding 23 and polyurethane foam bonded to the cladding's backside 8. The cladding 23, part of the foam 7 and the ribs 31 are continuous over the frame members 3 to comprise the panel's 1 continuous section 18. The panel's dropped section 19 consists of polyurethane foam 7 between the frame members 3, and the foam 7 also bonds the panel 1 to both the frame member's top edge 26 and the sides 25. Rotational resistance members are not shown, although rotational resistance may be provided by the dropped section 19 if it is deep enough to prevent the frame members 3 from rotating.

Ribs in a ribbed panel may be located in the continuous section, in the dropped section or partially in both the continuous and dropped section. When in the continuous section, the ribs may or may not be continuous over frame members and when in the dropped section the ribs extend to the sides of the frame members. While the ribs are generally transverse to the frame members and extend from frame member to frame member they may or may not touch the tops and/or sides of the frame members.

In another embodiment a ribbed panel may be both a frame supported ribbed panel and a ribbed structural section. FIG. 14 shows a perspective wall section with a frame supported ribbed panel 1 comprised of polyurethane foam 7 bonded to the backside 8 of a cladding 23 and to the sides of ribs 31, thereby also bonding the ribs 31 to the cladding 23. The ribbed panel 1 is supported by and bonded to a top plate 28 and a bottom plate 29, which are frame members. The ribs 31 may be fully or partially bonded to the top or sides of the top plate 28 and bottom plate 29. The ribs 31 also have flanges 16 on the ends for additional strengthening. Therefore, assuming a sufficient bond, the ribbed panel is in a fixed/continuous/dropped condition relative to the two plates which are frame members and the panel's increased load capacity is induced on the panel 1 parallel to the ribs 31. As such, the ribbed panel's increase in load capacity is compared to the same ribbed panel as simply supported since the ribbed panel is not continuous over two or more spans. The rotational resistance for such a the ribbed panel is provided by the foundation, slab, floor, joists, rafters, etc. (not shown) to which the plates are bonded to and prevent the plates from rotating.

In addition, a ribbed structural section 10 is also shown in FIG. 14 where the panel 1 is a foam composite panel 1 comprised of cladding 23 as the continuous section 18 and foam 7, as the dropped section 19, bonded to the cladding 23. In this configuration the ribs 31 are not part of the panel 1 but rather function as frame members 3 supporting the continuous/dropped panel. Assuming a sufficient bond, a fixed/continuous/dropped condition is induced on the foam composite panel 1 based on the panel's continuous/dropped configuration to the ribs 31, acting as frame members 3. While this increase in load capacity was caused perpendicular to the ribs 31, it still results in an increased load capacity of the panel in any direction. The ribbed structural section's rotational resistance is provided by the top 28 plate and the bottom plate 29, although intermediate rotational resistance members (not shown) may also be needed.

In order to achieve increased load capacity, it is necessary to provide frame members with sufficient rotational resistance. Panels induced with the new conditions use frame members to increase their load capacity. Both the fixed/continuous and the fixed/continuous/dropped conditions sufficiently bond the panel to the frame members making the frame members an extension of the panel and thereby subject to rotational forces from loads applied to the panel. This differs from both a simply supported panel and a continuous panel which are both free to rotate without forcing the frame members to do likewise. Testing has shown that rotational resistance is necessary with a fixed/continuous or a fixed/continuous/dropped conditioned panel to attain an increased load capacity.

FIGS. 1 and 2 show a rotational resistance member 34 attached to the bottom edges 27 of the frame members 3 to prevent the frame members from rotating when a load 11 is applied to the panel 1. For example gypsum board fastened 2 to the bottom edges 27 of frame members 3 in FIGS. 1 and 2 can provide sufficient rotational resistance for most building panel load situations. Rotational resistance can also be achieved with blocking 35 between the sides 25 of frame members 3 that are supporting the panel 1 as shown in FIG. 15. The blocking 35 may be for the entire depth of the frame member 3 or only at or near the bottom edge 27. Other types of rotational resistant members include purlins, beams, floors, foundations, joists, etc. Basically any element that can be attached to the sides or bottom edge, i.e. non-top edges, of two or more adjacent frame members and resist the degree of rotation for a particular increased load for a particular application may be a rotational resistance member. This includes a fixed/continuous/dropped panel's dropped section which extends in depth along the frame members sides. The deeper the dropped section and/or the bond between the dropped section and the frame members, the greater the rotational resistance.

The rotational resistance members may cover a small section or the entire backside of the composite panel and include fiberglass or other thickened or reinforced spray material capable of resisting frame member rotation. Nails and other fasteners inserted through a panel and into the top edge of frame members are specifically excluded as rotational resistance members when the panel is in a fixed/continuous/dropped condition since testing has shown that the panel's adhesive bonding to the frame members will cause them to be ineffective. Regardless of the type or amount of rotational resistance members, it is important frame members have sufficient rotational resistance to prevent their rotation and thereby enable the panel to carry any predetermined or other amount of an increased load capacity.

Cladding is defined as any panel, material or combination of materials used to provide a cover for a framed structure and thereby cladding is a cover. Cladding may be of any size and shape and of any material including panels, panel skins, siding, tiles, bricks, stones, shingles, aggregates, stucco, fiberglass, coatings, film, paint and other materials and even a foam's integral skin if the skin has a modulus of elasticity different than the foam's core. Coatings, film and paint are only considered a cladding if the total dried thickness is greater than 10 mils (0.01"). The cladding may be a panel itself, such as plywood or a foam board or may it be a part of a panel such as a coating applied to a foam board or a laminated panel. The cladding has a face, i.e. front side or exposed side, and a backside that is generally unexposed and may be bonded to another material. Sheathing is herein defined as a separately installed covering over a frame that has a flexural stiffness of more than 5,000 lbs-in$^2$ and is covered by a separately installed cladding. As such, sheathing is also a cover. Since a dried coating, film or paint of 10 mils (0.01") or less are not claddings, sheathing covered by these materials is a cladding. Alternatively, if coating, film or paint of any thickness are applied to a separately installed panels having a flexural stiffness of less than 5,000 lbs-in$^2$, the resulting coated panel is a cladding.

Testing was conducted on foam composite panels comprised of two pound polyurethane foam bonded to the backside of several different claddings including a 0.04 inch vinyl panel, 0.344 inch plywood and an XPS board. A variety of load tests where performed for both a fixed/continuous and a fixed/continuous/dropped condition on the respective panels. In all cases the polyurethane foam composite panels had an increased load capacity over the load capacity of a simply supported or a continuous panel over the same spans. In the case of the 0.04 inch vinyl cladding, the polyurethane foam provided substantially all of the load capacity. As such this results in the ability to use thin (around 0.125 inch) and even ultra thin (around 0.005 to 0.05 inch) claddings that have little or no influence on a composite panel's flexural stiffness and let the foam provide the load capacity.

This is contrary to present construction practices where foam is used solely as an insulation applied to structural sheathing with little or no influence on the panel's flexural stiffness. For example, when two inches of two pound polyurethane foam, with a modulus of elasticity of about 1,000 psi, is bonded to 0.75 inch of wood sheathing, with a modulus of elasticity of about 1,600,000, the foam provides only 1% of the panel's flexural stiffness. However, if the same two inches of polyurethane foam is bonded to 0.25 inch thick wood, the foam provides about 24% of the composite panel's flexural stiffness. The polyurethane foam's influence is even more dramatic when the cladding is a coating and the foam provides 100% of the flexural stiffness.

Another way to ensure using weaker panels or the use of material with a low modulus of elasticity is to require that the foam provide some meaningful amount of a panel's flexural stiffness. For example, one inch of EPS foam boned to the backside of 0.12 inch vinyl cladding will provide about 33% of the resulting composite panel's flexural stiffness. Or, one inch of polyurethane foam bonded to the backside of a ribbed vinyl panel with 0.08 inch wide by one inch tall ribs will provide about 5% of the composite panel's flexural stiffness. Therefore in another embodiment of the inventive subject matter, foam must provide at least 5%, preferably at least 10%, more preferably at least 20% and more preferably at least 30% of the flexural stiffness of a thickened section of a foam composite or a foamed backed panel over at least half of the panel's spans.

Due to the importance of the foam in providing part of a foam backed panel's flexural stiffness, the foam must have a minimal modulus of elasticity. As such, the minimum modulus of elasticity of a foam in this disclosure is 100 psi. Beyond this, the foam used herein may be any type of foam capable of being formed into a rigid or semi-rigid foam board and capable of providing at least R2 insulation per inch of thickness. In a foam backed panel, the foam may be adhesively or otherwise bonded or unbonded to the cladding and frame members and the foam may provide a backing or otherwise support all or part of the cladding. The foam may have a self bonding or self-adhesive bonding capability such as polyurethane foam or the foam may be bonded to the cladding and frame members with another bonding technique. Unless otherwise noted, polyurethane foam referenced herein is the self-bonding, liquid applied foam that is typically sprayed or poured, expands and self-bonds to materials it comes in contact while it is expanding. In some cases it may be desirable to use an adhesive foam in conjunction with a separate bonding technique or material. The foam may also be of two or more types, for example an EPS foam board used as the continuous section 18 and a polyurethane foam used as the dropped section 19 in a continuous/dropped configuration as shown in FIG. 3. The foam may also be optionally bonded to frame members, optionally fixed to frame members or optionally free of an adhesive bond to frame members.

A foam backed panel may be a composite panel with materials adhesively bonded together or an unbonded panel wherein the materials are not bonded together but merely stacked, or a combination of the two panels. In all three cases, a foam backed panel has a flexural stiffness for the continuous section and for the thickened section over a span. A foam may provide a direct or indirect backing to a cladding material by being in direct contact or indirectly by having one or more other materials between the foam and the cladding's backside. The foam may cover all of part of the cladding's backside and the cladding may be directly or indirectly in contact with frame members. For example the cladding may be in the continuous section over the frame members while the foam is in a dropped section. Although when the cladding is in direct contact with the frame members, it has to be more substantial than a coating or a foil paper, for example. As such claddings, when used as the sole material in the continuous section or the continuous section itself must be at least 0.02 inch thick, preferably at least 0.03 inch thick, more preferably at least 0.04 inch thick and even more preferably at least 0.05 inch thick. Foam adhesively bonded to a cladding shall also mean a cladding adhesively bonded to the foam. For example, foam may be bonded to the backside of a cladding or a coating or other cladding may be applied to the foam, both of which creates a foam composite panel.

Regardless of whether the cladding is a panel or part of a panel, the panel's continuous section should not be more than six inches thick. This will allow for all types of claddings to be used as a composite panel 1, including brick 43 that can be bonded to frame members 3 with continuous polyurethane foam 7 as shown in FIG. 16. Rotational resistance members 34 can be used to prevent the frame members 3 from rotating. As such, the continuous section 18 must be from 0.02 inch to 6 inches in thickness. It should be noted that when a break or seam exists in the cladding over a span, such as with bricks, the cladding provides little or no load capacity to the panel. In FIG. 16 while the bricks 43 and the foam 7 comprise the panel 1 in a fixed/continuous/dropped condition, only the foam 7 is induced since the bricks are not continuous over a span 6. Although, in some cases a cladding that is not continuous may impact the panel's load capacity, which can be determined by load testing. The maximum thickness of a panel is 18 inches since the continuous section can be 6 inches thick and it is common for foam cavity insulation to be as much as 12 inches thick.

In another embodiment some foams such as polyurethane foam can be applied in a continuous manner and be extended or spliced together with newly applied foam while retaining it's structural continuity. Structural continuity means that polyurethane foam's structural properties, such as bonding capacity, load carrying capacity, tensile strength, etc., are continuous from the old or previously applied foam to the newly applied foam even if there are one or more days between applications, as though all the foam was applied at the same time. This assumes the new foam has the same or higher properties than the old foam. This has several important ramifications when applied to the inventive matter.

Structural continuity enables polyurethane foam or foam composite panels to be continuous over an unlimited number of spans. This is important to load capacity since a continuous panel over three or more spans has an inherent load capacity over its inside or center spans that is much greater than the outside span's load capacity. This is because a panel over the inside span is continuous over adjacent spans that react to a load on the inside span, whereas the outside spans only have a span on one side reacting to a load. As such an inside span has spans on both sides whereas an outside span is either a single span or has a span on only one side.

According to continuous beam analysis, a continuous panel over four equal spans will support about a 100% increase in load on it's outside spans and about a 212% increase in load capacity on it's inside spans above the panel's simply supported load capacity. A continuous panel over three spans will support about a 89% increase in load capacity over its outside spans as compared to a simply supported panel and about a 285% increase in load capacity on its inside (center) span. However, in both cases the increased load capacity of a panel over the inside spans is wasted or unrecognized since the weaker section of the panel, i.e. over the outside spans, determines the panel's effective load carrying capacity or rating. Until now, this waste of inherent load capacity was an unrecognized problem.

One novel solution to this problem is to enlarge the panel size so that there are a multitude of inside spans with only two outside spans. While not practical with most materials, it is practical with materials like polyurethane foam that can be sprayed or otherwise applied as a continuous panel over an entire wall or roof section. Moreover, by applying the continuous/dropped condition to the two outside spans or shorting the outside spans, the load capacity of the outside spans can be inexpensively increased to correspond to that of the inside spans. This has the effect of more than doubling the load capacity of a typical continuous panel.

For example, FIG. 17 shows a continuous panel 1 over four equal spans 6 created by spaced apart frame members 3 secured by a rotational resistance member 34. The outside spans 36 have a much thicker dropped section 19 than the inside spans 37 and thereby have a greater increased load capacity induced by its continuous/dropped condition while the inside spans 37 have a lower amount of increased load capacity induced from its fixed/continuous/dropped condition. As such, the increased load capacity induced on the outside spans 36 by a thicker dropped section 19 as shown in FIG. 17, corresponds to the increased load capacity on the inside spans 37 that is induced by the existence of continuous spans on both sides.

Testing of a polyurethane foam panel continuous over three spans showed that when one or both of the outside spans were given an increase in load capacity by inducing or further increasing a continuous/dropped condition, the outside spans were able to carry the same or even a greater load than the inside span. The same occurred when the outside spans were effectively shortened to have the same or more increased load capacity as the inside span. Testing also showed that it did not matter as to whether the inside spans were in a continuous condition, a fixed/continuous condition or a continuous/dropped condition. In all cases it was possible to increase the load capacity of the outside spans to correspond to the inside spans.

For example testing showed that a two inch thick two pound density polyurethane foam panel with a one inch continuous section and a one inch dropped section, supported 7.4 psf over a single span when simply supported. The same longer panel over two 14.5 inch spans supported 17.5 psf about a 141% increase in load capacity and consistent with the beam theory formulas. However, the same longer, unfixed panel over three 14.5 inch spans was able to support 42.4 psf over its inside (center) span which was 473% above the simply supported load and even higher than the 285% predicted increase for an inside span. The load capacity was easily increased on both outside spans of the three span panel to support 42.4 psf or more to correspond with the inside span. When the continuous/dropped panels were bonded with two pound polyurethane foam to induce a fixed/continuous/dropped condition, the inside span's load capacity increased to 60.9 psf, a 248% increase over the 17.5 psf when continuous over two spans. When bonded with eight pound foam the inside span's load capacity increased to 75.5 psf, a 331% increase over the 17.5 psf. In all cases the load capacity of the panel over the outside spans was increased to that of the panel over the inside span.

When the increased in load capacity from the enhanced continuous condition are compared to a continuous section, the increases are even greater. For example a one inch thick polyurethane foam continuous panel can support 1.2 psf over a single 14.5 inch span and 4.6 psf over the inside span of three 14.5 inch spans. However, when the above fixed/continuous/dropped condition is induced on the panel to increase it's inside span's load capacity to 75.5 psf, the increased load capacity is 1,541% above the 4.6 psf of the inside span in a three span continuous condition.

Testing was also conducted on panels continuous over six spans to ensure the same load capacity increases from the new conditions are applicable to inside spans that are inside other inside spans such a the middle two spans of a panel continuous over six spans. A 0.22 inch thick by eight inches wide by 96 inches long plywood panel was divided into four 14.5 inch inside spans and two 13.75 inch outside spans by 1.5 inch frame members. The plywood has a flexural stiffness of 1,530 lbs-in$^2$ and it's predicted and actual simply supported load capacity was 23 psf. Therefore the predicted inside span over five or more spans was a 230% increase or 75.9 psf. The plywood was bonded to the top of each frame member with 180 lb bonding strength. The fourth span from one end was the tested inside span with the two adjacent spans having uniform loads. The tested inside span carried 84 psf before deflecting 0.06 inch. As such, the fixed/continuous inside span carried 8.1 psf or 11% more than the same continuous conditioned inside span, which shows that the fixed/continuous condition is applicable to any number of a continuous panel's inside spans.

A one inch dropped section of polyurethane foam was then added to the 0.22 inch thick plywood panel continuous over six spans and bonded to the spaced apart frame members. The same inside span was tested as before and carried 89.5 psf or slightly more than the same spans without the dropped section. As such, the fixed/continuous/dropped condition is also applicable to any number of a continuous panel's inside spans. Although, in this case the 89.5 psf was only a 18% increase above the continuous section's 75.9 psf over the same span, consistent with the difficulty in increasing load capacities of panels with a higher flexural stiffness.

For purposes of this disclosure, increasing the load capacity of the outside spans to correspond with, i.e. be about the same as the load capacity of the inside spans, is called an enhanced continuous condition. The enhanced continuous condition is a panel supported by multiple spaced apart frame members with a continuous section that is continuous over and fixed to the top edges and/or the sides of the frame members and the spaced apart frame members create multiple inside spans of 2 or more, preferably 3 or more, more preferably 4 or more, even more preferably 5 or more and even still more preferably 6 or more spans with the outside spans having an increased load capacity to correspond to that of the inside spans. Increasing the load capacity of the outside spans may be accomplished by inducing or increasing a fixed boundary condition and/or by adding or increasing the depth or size of a dropped section, and/or by shortening the outside spans. Since increasing the load capacity of the outside spans enables the acknowledgment and utilization of the higher amounts of load capacity in the insides spans, the enhanced continuous condition may be said to increase the load capacity over two or more spans or more preferably over three or more spans or even more preferably over at least half of the spans and still more preferably over substantially all of the spans or even more preferably still over all of the panel's spans.

In another embodiment regarding polyurethane foam's structural continuity, two or more individual foam or foam composite panels may be spliced together to form a single, structurally continuous panel simply by applying polyurethane foam to the seams between the individual panels. Testing has shown that pouring or spraying polyurethane foam, of the same or greater density of the panels to be united, into a gap between the polyurethane foam of the respective panels, binds the panels together as though the foam on both panels and the foam in the gap were all applied at the same time to create the aforementioned structurally continuous panel. The polyurethane foam expands to fill the seam gap and bonds to each panel's polyurethane foam and cladding with the same degree of bonding capacity that the panels were originally formed with. This means, for example, that a seam over a span can be eliminated by filling in the seam at a latter time with the same polyurethane foam.

Several tests were conducted whereby a polyurethane foam panel made in a single casting had its load capacity compared to a polyurethane foam panel comprised of two separate, cured pieces spliced together by the same polyurethane foam. In all cases the load capacities were the same. For example, FIG. 18 shows the backside of two adjacent foam backed panels 1a and 1b comprised of a cladding 23 bonded to polyurethane foam 7 which also bonds each panel 1a and 1b to frame members 3. The panels 1a and 1b also have continuous sections 18 over the frame members 3 and a dropped section 19 between the frame members 3. The panels 1a and 1b in FIG. 18 are separate and have a seam 42 between them as can be seen by the backside 8 of the cladding 23 showing a break in the foam 7 with a seam 42 between the two panels. Depending upon the type of cladding 23 and installation process, the cladding 23 may or may not be continuous over the seam 42. A "seam" as herein used, is a break in previously applied foam, either within a panel or between panels and may be subsequently spliced with another foam to provide structural continuity of the foam. A splice is a seam filled with a foam that provides structural continuity between the foams on both sides of the seam.

In FIG. 18 the claddings 23 are butted together, overlapped or otherwise closed together, although the seam 42 is created by the absence of or a break in the polyurethane foam 7. In FIG. 19, the polyurethane foam 7 is poured or sprayed on the two cladding's backside 8, at the seam 42 and expands to fill the area surrounding the seam 42, while bonding to the two backsides 8 and to the existing polyurethane foam 7 on both sides of the seam 42. As such, the polyurethane foam 7 structurally bonds the two panels 1a and 1b together. A seam 42 may exist in the continuous section 18 and/or in the dropped section 19 and if needed, rotational resistance members can be attached to the frame members. Assuming the panel 1a and 1b are fixed to frame members 3 a fixed/continuous/dropped condition is induced over all spans.

The result is that the polyurethane foam effectively spliced the panels together as though there was never a seam between two panel's foam and thereby created a structurally continuous panel. In other words, the polyurethane foam 7 spliced area between the two frame members 3 has the same load carrying capacity as non-spliced polyurethane foam over the same span length. This of course excludes any load capacity provided by the cladding, since it remains discontinuous at the seam 42 in FIG. 19.

The implication of this is that adjacent wall or roof foam composite panels may be bonded together for structural continuity by simply spraying polyurethane foam onto the seamed area. The polyurethane foam not only bonds the panels together and seals the seam with an air, vapor and moisture barrier, but it also transforms two or more individual panels into a single panel spanning any number of frame members. The polyurethane foam between the frame members bonds together such that the resulting foam structure between the two frame members is in a fixed/continuous/dropped condition with a load capacity. In other words, the polyurethane foam splice and the polyurethane foam on both sides of the splice becomes a single foam with structural continuity as if all three sections where simultaneously sprayed as one structurally continuous panel.

This is important in those cases where the cladding's load capacity is inconsequential and the foam providing much or virtually all of the panel's load capacity. This process enables an exceptionally simple method of joining panels together during installation. It also points out that a single foam composite panel can be created to enclose an entire building. As long as the primary material(s) that provide the majority of the load capacity to a composite panel is continuous, the panel is considered to be a structurally continuous panel.

The foam's structural continuity also applies to the ability to thicken polyurethane foam at any time and achieve structural continuity through the foam's entire thickness. As such, structural continuity thickness is obtained by adding polyurethane foam to thicken a polyurethane foam composite panel at a later time that is more than five minutes after the initial application of polyurethane foam to the cladding. Regardless of when the additional polyurethane foam is added and the foam is thickened and has structural continuity over the entire thickness as if the foam was applied at the same time. For example, a polyurethane foam composite panel may be manufactured with a one inch continuous section of foam and then installed by positioning the panel against frame members or cladding spacers and then spraying polyurethane foam against the continuous section's foam backside to add a dropped section. As a result, the panel has structural continuity from the continuous section to the dropped section as though the foam was applied to both sections at the same time.

Figure 20:
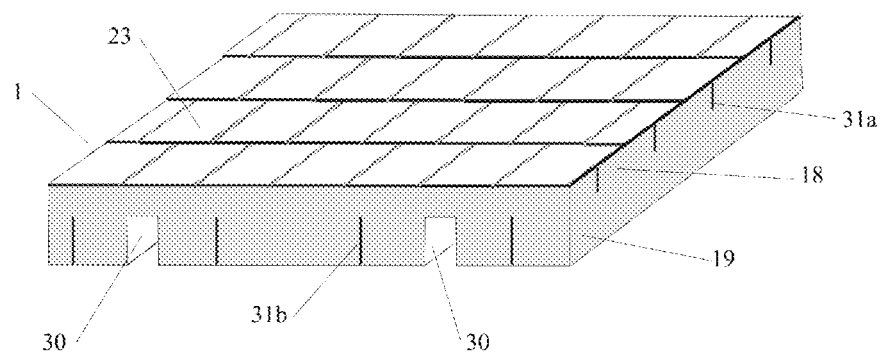
FIG. 20 is a slotted, rib embedded panel with a finished cladding.

In another embodiment, a panel having a continuous/dropped configuration may be prefabricated with slots for insertion of frame members. Upon inserting the frame members into the slots, a continuous/dropped condition is induced and if fixed to the frame members, a fixed/continuous/dropped condition is induced on the slotted panel. FIG. 20 shows a perspective of a slotted panel 1 having a continuous section 18, a dropped section 19 and slots 30 into which frame members are to be inserted to occupy all or part of the slot, i.e. slot area. A roof tile designed cladding 23 is also shown bonded to the continuous section 18, although the panel 1 may be without a cladding. The slots may be sized for tight fitting frame members or enlarged with side and possibly top gaps between the panel and the frame members to allow for insertion of a bonding material, such as polyurethane foam, to be injected into the gap and bond the panel to the frame members.

The slotted panel in FIG. 20 also shows ribs 31a and 31b embedded in the continuous section 18, and the dropped section 19 respectively. The ribs 31a in the continuous section 18 are perpendicular to and continuous over the slots 30 so as to be supported by the inserted frame members. The ribs 31b in the dropped section 19 are parallel to the slots 30 so as to stiffen the panel 1 during handling. The slotted panel 1 may also be without ribs. The slotted panel may be made of any material and may or may not be bonded to the frame members although sufficiently bonding the panel by filling the slot area not occupied by the frame members with polyurethane foam will bond the panel to the frame members and induce a fixed/continuous/dropped condition on the panel.

Figure 21:
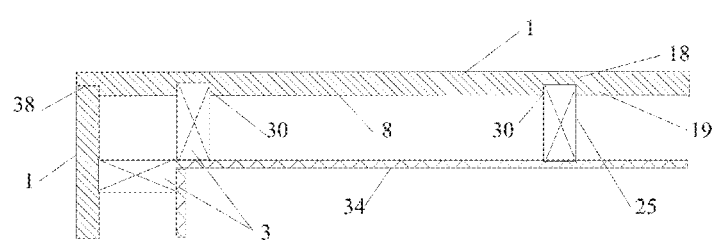
FIG. 21 is a frame supported panel notched to create a continuous/dropped condition.

FIG. 21 shows a single material panel 1 with a continuous/dropped condition created by a slot 30 such as a dado notched out of the backside 8 of the panel 1. This enables the panel 1 to have a continuous section 18 over the frame members 3 while also having a dropped section 19 between the frame members 3 that may be bonded to the frame member's sides 25. Assuming the panel 1 is fixed to the frame members, a fixed/continuous/dropped condition is induced on the panel 1. A rabbet 38 is also shown at the corner intersection of two panels 1. Rotational resistance members 34 are used as needed.

Figure 22:
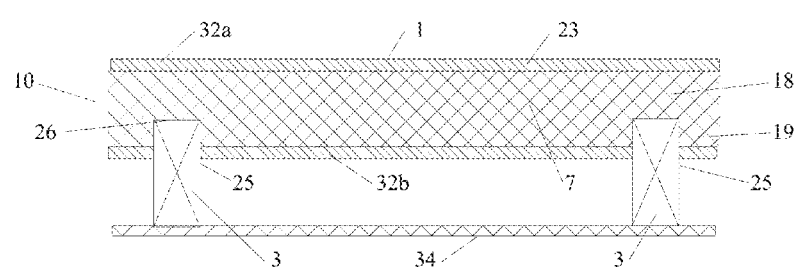
FIG. 22 is a foam core sandwich panel in a fixed/continuous/dropped condition.

In another embodiment, sandwich and double faced ribbed panels are panels of this disclosure if the panel is in a fixed/continuous/dropped configuration with the frame members such that the panel's outside is a continuous section and the panel's inside is slotted to be a dropped section between frame members. FIG. 22 shows a foam composite panel configured as a foam core slotted sandwich panel 1 having a polyurethane foam 7 core bonded to the outside skin 32a which is a cladding 23 to comprise the foam composite panel. The panel 1 has a continuous section 18 over the frame member's top edge 26 and a dropped section 19 between the frame member's sides 25 for a continuous/dropped condition, which becomes a fixed/continuous/dropped condition if the slotted sandwich panel 1 is fixed to the frame members 3. An inside skin 32b is also bonded to the bottom of the dropped section 19 and may be a cladding, a penetration barrier or some other type of barrier between the frame member's sides 25. The inside skin 32b may provide some degree of rotational resistance separately or in conjunction with a rotational resistance member 34, as well as substantially strengthen the structural section 10 by bracing the inside of the frame members 3. In another configuration, a typical sandwich panel may provide the panel's continuous section while fillets bonding the sandwich panel to the frame members are the dropped section.

In another embodiment a panel is made structurally sufficient for an application by inducing one of the herein disclosed new conditions. In many cases the amount of increased load capacity can be predetermined based on prior load tests of comparable panel's load capacity before and after conditions are applied. In addition, testing can be used to determine the amounts of increased load capacity expected with different variables such as condition applied, panel material and thickness, bonding capacity, span, bonding area, etc., and the appropriate combination applied to attain at least a predetermined amount. Knowledge that a certain combination results in attaining at least some minimum amount of increased load capacity, means that amount was predetermined. Such testing also enables the ability to regulate and rate the structural sufficiency of a panel by providing parameters that results in known increases in load capacity induced on a panel by a fixed/continuous condition and/or a continuous/dropped condition.

The determination as to whether a panel is structurally sufficient or not, is based upon a given deflection, load and span as prescribed by a code, rule, specification, directive or other requirement or desire concerning the particular structure to which the panel is being attached. For example, a building code or an engineer may specify that a building panel not deflect more than L/240 when a 40 psf lateral load is applied. If L=16 inches, the maximum allowable deflection for this 40 psf load is 0.067 inch. This maximum allowable deflection is then used to determine the minimum amount of load capacity necessary for a building panel to support this load. Typically, a load capacity greater than the minimum amount is specified in order to provide a safety or other factor that ensures the panel meets or exceeds its load carrying requirement. As such, in most cases it is necessary to identify and thereby predetermine some degree of a panel's increased load capacity to ensure it is sufficient for an application.

In another embodiment a foam composite panel bonded to frame members may be prefabricated or fabricated in place and the foam may be applied to the cladding or the cladding applied to the foam. The foam composite panel bonded to frame members may be jobsite fabricated by positioning a cladding adjacent to an erected frame or frame members and then applying foam to the backside of the cladding and bonding the foam to the frame members. Bonding to the frame members may be accomplished by using polyurethane foam or by using a separate adhesive between the foam and the frame members.

As shown in FIG. 23, cladding 23, comprised of a ribbed 31 siding panel 24 is attached to erected frame members 3 with fasteners 2 or other bonding. In this configuration the ribs 31 provide a spacing 44 between the cladding 23 and the frame member 3 to enable the polyurethane foam to fill in the spacing 44 and provide a continuous condition over the frame members 3. FIG. 24 shows the siding panels 24 fully attached to the frame members 3 and polyurethane foam 7 filled into the spacing 44 and bonding to the side 25 of the frame member to bond the siding panel 24 to the frame members 3. Assuming a sufficient bond, the panel 1 is induced with a fixed/continuous/dropped condition.

In another embodiment siding boards 24 may be lapped and spaced away from the stud with spacers 39 and clips 50 that attach to the siding board's backside 8. The clips 50 attach to the backside 8 near the bottom of the siding board 24 and enable the siding board 24 to overlap and hang from the siding board 24 below. The siding board is then secured in place by attaching the spacer 39 to the stud. As such an open spacing 44 is created between the siding board 24 and the stud 3 into which insulation may be placed.

In another configuration of the panel being fabricated in place, cladding spacers are situated between the panel and the frame members to provide a space into which foam may be applied. A cladding spacer is a structure that creates open space between the frame members and a cladding or a composite panel. FIG. 26 is a section view of a framed wall comprised of frame members 3 attached to a bottom plate 29 which is attached to a foundation 46 or floor structure. Also shown is a temporary brace 33 fastened 2 to the foundation 46 and preferably secured at its top (not shown) and used to support siding panels 24 while being bonding to the frame members 3. The siding panels 24, which are a cladding, are positioned against the brace 33 and secured by a cladding spacer 39 wedged between the siding panel 24 and the frame member 3. As a result, a spacing 44 is created between the siding panel 24 and the frame members 3. The cladding spacers 39 may be any material although a small foam block is preferred so as to prevent a thermal bridge. Once the siding panels 24 have been positioned, they may be further secured by a clump of polyurethane foam (not shown) sprayed between the siding panel 24 and the frame members 3.

FIG. 27 shows the same framed wall of FIG. 26, with a panel 1 comprised of polyurethane foam 7 applied to the backside 8 of the siding panels 24, which represents the cladding 23 of this panel 1. The polyurethane foam 7 filled in and occupies the spacing 44, to sufficiently bond the siding panels 24 to the frame members 3. A continuous section 18 is comprised of the siding panels 24 and the polyurethane foam 7 in the spacing 44. The polyurethane foam 7 is also the dropped section 19 bonded to the frame member's sides 25. As such, the panel 1 is continuous over, dropped between and fixed to the frame members 3 to induce a fixed/continuous/dropped condition on the panel 1. The polyurethane foam 7 may also seal the siding panel 24 to the bottom plate 29 and the foundation 46. The purpose of the cladding spacers is to provide a spacing between the cladding and the frame members that can be filled with an insulating material such as foam. As such the cladding spacers may be individual spacers or an elongated member fastened to the frame members and/or the cladding.

Figure 28:
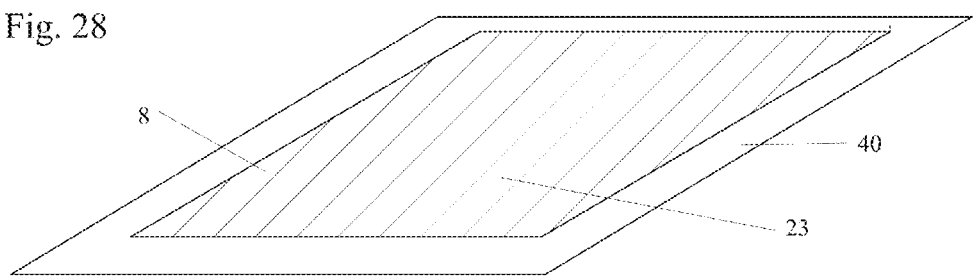
FIG. 28 is a surface onto which cladding is positioned face down.

A foam composite panel bonded to frame members may also be prefabricated, which includes the spray-up manufacturing process. Prefabrication begins with preparing a surface such as a platform, worktable, backstop, raised jig or form and positioning the cladding material on the surface. FIG. 28 shows a surface 40 onto which a cladding 23 is positioned with its backside 8 up, i.e. exposed. The surface 40 may be horizontal, vertical or at some angle. The cladding 23 may be positioned in a number of ways, depending upon the type of material used. For example a coating material may be sprayed against a prepared form surface 40, or an aggregate cladding may be spread over a horizontal surface 40, or siding panels, tiles, thin bricks or similar types of cladding 23 may be laid-out on a worktable. The cladding 23 may also be a composite comprised of two or more different materials or materials with different properties. For example a polyurea may be sprayed onto a form surface 40 followed by a resin mixture poured or spayed on top of the polyurea to comprise a composite cladding 23. The cladding 23 may also comprise siding boards, shingles, tiles, etc.

Windows and door frames and cladding trim pieces may also be positioned on the surface 40 with the cladding 23 butting up to them. The cladding may be recessed from the windows, doors and trim by placing the cladding on a raised jig that causes the face of the cladding to be in a plane setback from face of the window and door frame and the trim. (not shown)

Figure 29:
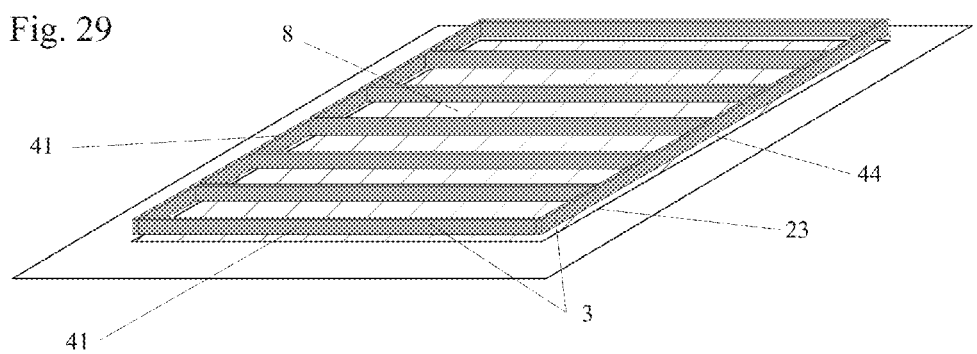
FIG. 29 is FIG. 28 with a frame positioned above the cladding.
Figure 30:
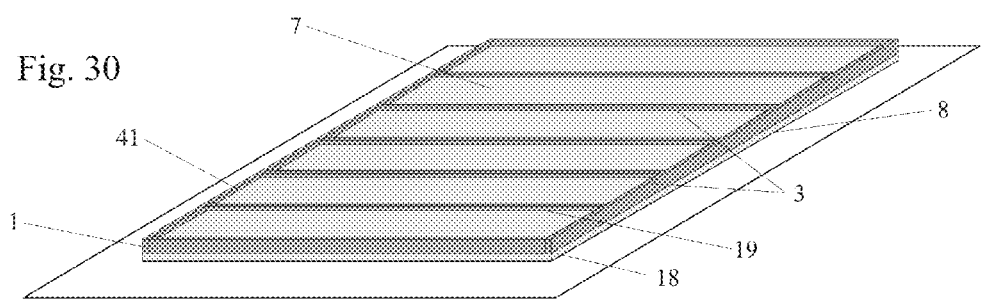
FIG. 30 is FIG. 29 with the addition of polyurethane foam to bond everything together.

After the cladding 23 has been positioned, a frame 41 or individual frame members 3 are positioned above the cladding 23 as shown in FIG. 29. The frame 41 may be suspended or spacers may be used to create a spacing 44 between the backside 8 of the cladding 23 and the frame 41. Polyurethane foam 7 is bonded to the backside 8 of the cladding to create a foam composite panel 1 as shown in FIG. 30. The polyurethane foam 7 may be poured or sprayed onto the backside 8 and as it expands it bonds the cladding to the frame 41 and individual frame members 3. FIG. 30 shows that both a continuous section 18 and a dropped section 19 are present and if fixed to frame members 3, a fixed/continuous/dropped condition is induced on the panel 1. Fillets may be added to further increase the panel's 1 load capacity.

There are several possible alternatives to the spray-up process including spraying a polyurea or similar coating on a form as the cladding, followed by spraying or pouring on a liquid polyurethane foam on the backside of the cladding and the window and door frames if present. Arranging a frame or frame members above the coating's backside and letting the polyurethane foam to expand and bond the coating to the frame members. The foam only takes a few minutes to sufficiently cure before the entire panel, cladding, windows and doors, frame and all, may be removed from the surface.

In another embodiment both the fixed/continuous condition and the fixed/continuous/dropped condition, when bonded to frame members, increases a panel's uplift resistance simply due to the bond between the panel and the frame members. The uplift resistance is even more pronounced with ribbed panels since the ribs provide additional bonding area as well as introducing a shear bond between the foam and the rib's sides. Moreover, when the ribs are perpendicular to the frame members, the bonding is extended along the ribs.

Figure 31:
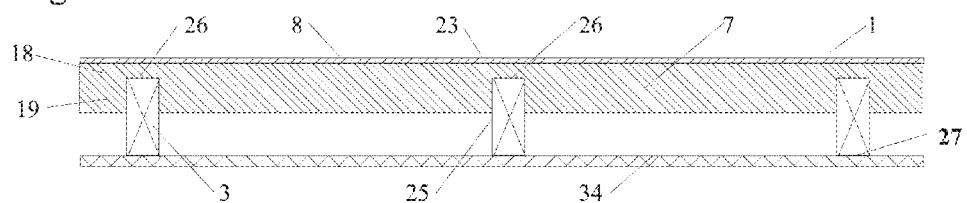
FIG. 31 is a panel in a fixed/continuous/dropped condition to minimize the cladding's thermal expansion and contraction.

In another embodiment the continuous/dropped conditions can minimize the effects of thermal expansion or contraction on cladding materials. FIG. 31 shows polyurethane foam 7 bonded to the backside 8 of a cladding 23 to create a foam composite panel 1 that is fixed to the frame members 3 to induce a fixed/continuous/dropped condition on the panel 1. As such, the panel's 1 continuous section 18 is bonded to the frame member's top edge 26 and more importantly is thoroughly bonded to the dropped section 19 which in turn is both bonded to and constrained between the sides 25 of frame members 3. Since the dropped section's 19 span is relatively small, the change in linear dimension is so small that the frame member's 3 physical presence prevents the foam 7 in the dropped section 19 from expanding. In addition, if the foam 7 is sufficiently bonded to the frame member's sides 25, the foam 7 in the dropped section 19 is prevented from contracting. As a result, since the foam 7 in the dropped section 19 cannot expand or contract, neither can the foam 7 in the continuous section 19 nor can the entire panel 1. FIG. 31 also shows a rotational resistance member 34 attached to the bottom edges 27.

Figure 32:
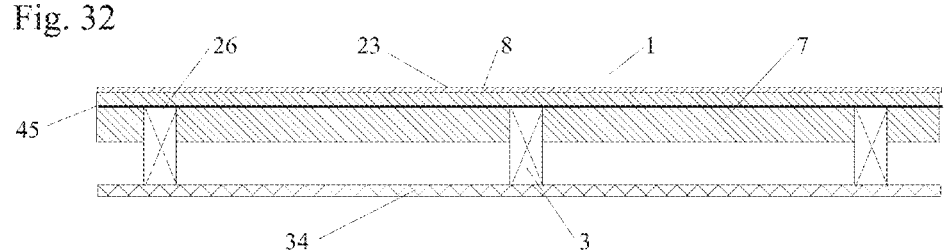
FIG. 32 is a panel in a fixed/continuous/dropped condition with mesh embedded in the polyurethane foam as an anti-penetration barrier.

In another embodiment, a mesh is bonded to the frame members to provide an anti-penetration layer to the panel. As shown in FIG. 32, a mesh 45 is stapled to the top edge 26 of frame members 3 and is continuous over two or more frame members 3. Polyurethane foam 7 is applied to the backside 8 of the cladding 23 and as it expands into a continuous/dropped configuration, the polyurethane foam 7 engulfs the mesh 45 resulting in mesh 45 being an embedded layer in the polyurethane foam 7. The mesh 45 provides an anti-penetration layer to the panel 1 by its attachment to the frame member's top edge 26 which absorbs a shear force from any projectile penetrating the panel 1. The stronger the mesh material, the greater penetrating resistance. A rotational resistance member 34 is needed to prevent frame member 3 rotation. The mesh 45 may be bonded or otherwise attached to the frame members 3 in any fashion. The panel 1 is induced with a fixed/continuous/dropped condition if it is fixed to the frame members 3.

In another embodiment the continuous/dropped condition enables thinner frame members since the dropped section's bond to the frame member's sides can provide practically all of the necessary panel support. In addition, the dropped section supports the thinner frame member from buckling and can be used to prevent the frame from racking and may provide some or all of the rotational resistance. The dropped section can be of the same or a different material than the continuous section.

Figure 33:
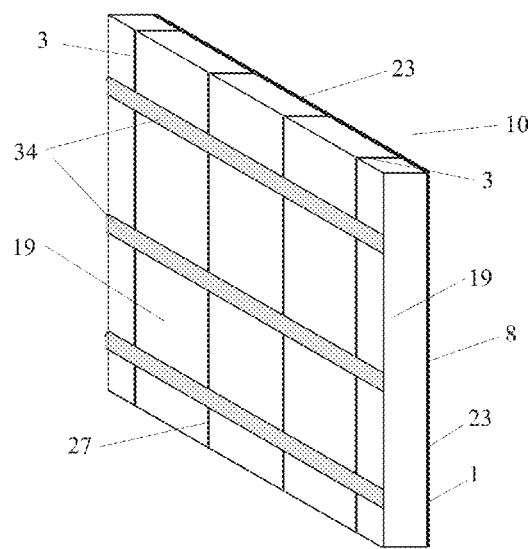
FIG. 33 is a perspective of the backside of a panel showing thin frame members bonded to the panel and to the rotational resistance members.

FIG. 33 shows a perspective of a structural section 10 comprised of a thin skin, i.e. cladding 23, on the front side that is continuous over and bonded to thin frame members 3. Also shown is a dropped section 19, of another material, bonded to the backside 8 of the cladding 23 to comprise a composite panel 1. The dropped section 19 is fixed to the sides of frame members 3 to induce a fixed/continuous/dropped condition on the composite panel 1. The dropped section 19 also reinforces the frame members 3 from buckling. Also shown are rotational resistance members 34 bonded to the bottom edge 27 of the frame members 3 and optionally bonded to the dropped section 19.

Since the rotational resistance members 34 are individual, spaced apart members, the composite panel 1 is not a sandwich panel. A sandwich panel's increased load capacity derives from the interaction between the two skins bonded to a core material A panel of the inventive subject matter obtains an increase in load capacity by the panel's interaction with the frame members and in particular the panel being continuous over frame members, fixed to frame members and having a dropped section between frame members, or any combination thereof.

From the description above, a number of advantages of some embodiments of the stiffened, frame supported panel become evident:

(a) The inventive subject matter enables weaker, thinner, lighter, more versatile and less expensive materials to have their load capacities greatly increased to enable them to used as structural panels.

(b) The inventive subject matter enables all types of panels to have an increased load capacities of several times and in some cases a several thousand percent increase above the same simply supported panel.

(c) The inventive subject matter enables polyurethane foam bonded to a cladding and frame members to become a comprehensive structural panel that provides a finished exterior, continuous and cavity insulation as well as an air, moisture and vapor barrier, increased uplift resistance and the elimination of condensation and thermal expansion/contraction.

(d) The inventive subject matter enables fillets to be used to increase a panel's load capacity by several thousand percent above that of the same simply supported panel.

(e) The inventive subject matter enables panels to have substantial increased load capacity without thickening their structural section.

(f) The inventive subject matter enables panels to utilize the inherent increased load capacity of inside spans which is presently wasted.

(g) The inventive subject matter enables a low cost spray-up process to manufacture comprehensive building panels.

(h) The inventive subject matter enables thinner frame members since panels can be bonded to frame member's sides to support the panel and thinner frame members can be supported by the panel's dropped section.

(i) The inventive subject matter enables prefabricated slotted panels to have its load capacity increased multiple times by simply being sufficiently bonded to frame members.

(j) The inventive subject matter enables thin ribbed panels to have a substantial increase in load capacity by being filled with and bonded to frame members with polyurethane foam that also prevents the ribs from buckling.

(k) The inventive subject matter enables the new conditions induced on a panel to act in series such that each incremental increase in load capacity is compounded by the next condition to increase a panel's load capacity by many times.

(l) The inventive subject matter enables a fixed/continuous/dropped condition to greatly reduce thermal expansion and contraction on susceptible claddings.

Although the description above contains many specifications, these should not be construed as limiting the scope of the embodiments but as merely providing illustrations of some of several embodiments. Thus the scope of the embodiments should be determined by the appended claims and their legal equivalents, rather than by the examples given.

What I claim is:

1. A stiffened frame supported panel comprised of:
   a. two or more frame members having a top edge, a bottom edge and two sides and said frame members are spaced a distance apart with one or more individual spans between said frame members and
   b. a continuous panel comprised of a polyurethane foam composite panel having a cover and continuous over said top edges and said continuous panel is supported by said frame members and has a continuous conditioned load capacity over each said individual span as determined by a load test measuring deflection and
   c. said continuous panel has one or more dropped sections between said sides and
   d. said continuous panel fixed to said frame members with a sufficient adhesive bond to induce a fixed boundary condition on said continuous panel and
   e. one or more rotational resistance members attached to said sides or bottom edge of two or more adjacent said frame members and
   f. said continuous panel is stiffened by said dropped section, said fixed boundary condition and said rotational resistance members for an increased load capacity, as determined by said load test, at least 25% greater than said continuous conditioned load capacity over at least one said individual span,
   whereby said panel is stiffened.

2. The frame supported panel of claim 1 wherein said increased load capacity is predetermined from prior load tests to be more than 25% greater than said continuous conditioned load capacity.

3. The frame supported panel of claim 1 wherein said increased load capacity is at least 50% greater than said continuous conditioned load capacity and is predetermined from prior load tests to be more than 50% greater than said continuous conditioned load capacity.

4. The increased load capacity of claim 3 predetermined from prior load tests to be more than 200% greater than said continuous conditioned load capacity and is predetermined from prior load tests to be more than 200% greater than said continuous conditioned load capacity.

5. The frame supported panel of claim 1 wherein said dropped sections comprise fillets and said fillets are fixed to said frame members.

6. The frame supported panel of claim 1 wherein said cover comprises sheathing and said foam composite panel comprises polyurethane foam bonded to the backside of said sheathing.

7. The frame supported panel of claim 1 wherein said cover comprises a cladding and said foam composite panel comprise polyurethane foam bonded to said cladding's backside.

8. The frame supported panel of claim 7 wherein said foam composite panel comprises said cladding backed by ribs embedded in polyurethane foam to create a frame supported ribbed panel.

9. The frame supported panel of claim 7 wherein said foam composite panel is adhesively bonded to said top edges' interface with a sufficient adhesive bond to induce a fixed boundary condition on said continuous panel.

10. The frame supported panel of claim 1 wherein an inside skin is bonded to said dropped section.

11. The frame supported panel of claim 1 wherein said frame members comprise a jobsite assembled frame and said foam composite panel comprises said cover bonded to said jobsite assembled frame with polyurethane foam.

12. The frame supported panel of claim 11 wherein said foam composite panel is a frame supported ribbed panel comprising a cladding backed by ribs adhesively bonded to said cover's backside.

13. The assembled frame of claim 11 wherein a spacer is inserted between said assembled frame and said cover and said spacer is embedded in said polyurethane foam.

14. The frame supported panel of claim 1 wherein said foam composite panel is adhesively bonded to said top edges' interface with a sufficient adhesive bond to induce a fixed boundary condition on said continuous panel.

15. The frame supported panel of claim 1 wherein a mesh is continuous over and attached to said top edges.

16. The frame supported panel of claim 1 wherein said dropped section is comprised of polyurethane foam and said foam is adhesively bonded to said composite panel and said frame member's sides.

17. The frame supported panel of claim 1 wherein said foam composite panel comprises a slotted panel having slots formed in said dropped section sufficient to contain one or more said frame members.

18. The frame supported panel of claim 1 wherein a single structurally continuous panel formed by a first said foam composite panel and a second said foam composite panel positioned side by side with a seam with a polyurethane foam splice in said seam.

19. The frame supported panel of claim 1 wherein said foam composite panel comprises ribs embedded in polyurethane foam to create a frame supported ribbed panel.

* * * * *